United States Patent
Takahashi et al.

(10) Patent No.: US 8,782,650 B2
(45) Date of Patent: Jul. 15, 2014

(54) DISTRIBUTED PROCESSING OF PARTITIONED STREAM DATA INCLUDING DATA ELEMENT GROUP AND END DATA

(75) Inventors: Kenta Takahashi, Tokyo (JP); Naohiro Suzuki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 937 days.

(21) Appl. No.: 12/716,713

(22) Filed: Mar. 3, 2010

(65) Prior Publication Data
US 2011/0145828 A1    Jun. 16, 2011

(30) Foreign Application Priority Data
Dec. 16, 2009    (JP) .................................. 2009-285785

(51) Int. Cl.
*G06F 9/46* (2006.01)
*G06F 9/48* (2006.01)

(52) U.S. Cl.
CPC ............ *G06F 9/4881* (2013.01); *G06F 9/4843* (2013.01)
USPC ........................................................ 718/102

(58) Field of Classification Search
CPC ................................................... G06F 9/4881
USPC ........................................................ 718/102
See application file for complete search history.

(56) References Cited

U.S. PATENT DOCUMENTS

| 6,801,938 | B1 * | 10/2004 | Bookman et al. ............. 709/224 |
| 7,487,206 | B2 * | 2/2009  | Gu et al. ...................... 709/203 |
| 7,945,540 | B2 * | 5/2011  | Park et al. ..................... 707/692 |
| 2006/0277230 | A1 | 12/2006 | Nishizawa et al. |
| 2008/0256146 | A1 | 10/2008 | Nishizawa et al. |

FOREIGN PATENT DOCUMENTS

| JP | 09-265459 | 10/1997 |
| JP | 2006-252394 | 9/2006 |
| JP | 2006-338432 a | 12/2006 |

OTHER PUBLICATIONS

Golab, L. et al., "Issues in Data Stream Management", *SIGMOD Record*, vol. 32, No. 2, Jun. 2003, pp. 5-14.

* cited by examiner

*Primary Examiner* — Meng An
*Assistant Examiner* — Brian Chew
(74) *Attorney, Agent, or Firm* — Foley & Lardner LLP

(57) ABSTRACT

A stream data processing apparatus creates a plurality of partition data on the basis of stream data, and distributes the partition data to a plurality of computers. Specifically, the stream data processing apparatus acquires from the stream data a data element group that is configured in the number of data elements based on the processing capability of the partition data destination computer, and decides an auxiliary data part of this data element group based on a predetermined value. The stream data processing apparatus creates partition data that include the acquired data element group and END data. The data element group is configured from the auxiliary data part and a result usage data part.

12 Claims, 21 Drawing Sheets

FIG. 2

| STREAM ID | TIME STAMP | VALUE |
|---|---|---|
| S1 | 10:00:00 | 30 |
| | 10:00:01 | 24 |
| | 10:00:02 | 45 |
| | ... | ... |
| S2 | 11:30:00 | 61 |
| | 11:30:01 | 83 |
| | ... | ... |

| STREAM ID | DATA QUANTITY | DATA ACCUMULATION TIME |
|---|---|---|
| S1 | 13500 | 10 SECONDS |
| S2 | 150000 | 30 SECONDS |

REGISTER STREAM S1 (value INTEGER) ;
REGISTER STREAM S2 (temperature INTEGER) ;

REGISTER QUERY Q1 ISTERAM (
   SELECT SUM(S1. value)
   FROM   S1 [ROWS  10]
) ;

REGISTER QUERY Q2 ISTREAM (
   SELECT AVG (S2. temperature)
   FROM   S2 [RANGE  30 seconds]
) ;

| SERVER NAME | IP ADDRESS | STREAM ID | QUERY ID | WINDOW SIZE | THROUGHPUT | INPUT QUEUE STATUS |
|---|---|---|---|---|---|---|
| SERVER A | 192.168.1.4 | S1 | Q1 | 10 COUNT | 1000 COUNTS/SECOND | 50 COUNTS |
| | | S2 | Q2 | 30 SECONDS | 50 COUNTS/SECOND | 200 COUNTS |
| SERVER B | 192.168.1.6 | S1 | Q1 | 10 COUNT | 1000 COUNTS/SECOND | 0 COUNT |
| | | S2 | Q2 | 30 SECONDS | 50 COUNTS/SECOND | 0 COUNT |

| STREAM ID | QUERY ID | WINDOW SIZE |
|---|---|---|
| S1 | Q1 | 10 COUNT |
| S2 | Q2 | 30 SECONDS |

| QUERY ID | PARTITION DATA ID | OPERATION-TARGETED START TIME |
|---|---|---|
| Q1 | 000001 | 10:00:24 |
| Q2 | 000302 | 11:00:34 |

| QUERY ID | PARTITION DATA ID | END SENT YES/NO | PROCESSING RESULT STORAGE LOCATION |
|---|---|---|---|
| Q1 | 000001 | YES | 0x384621F |
| Q1 | 000002 | NO | — |
| Q2 | 000301 | YES | 0x289463D |
| Q2 | 000302 | NO | — |

FIG. 13
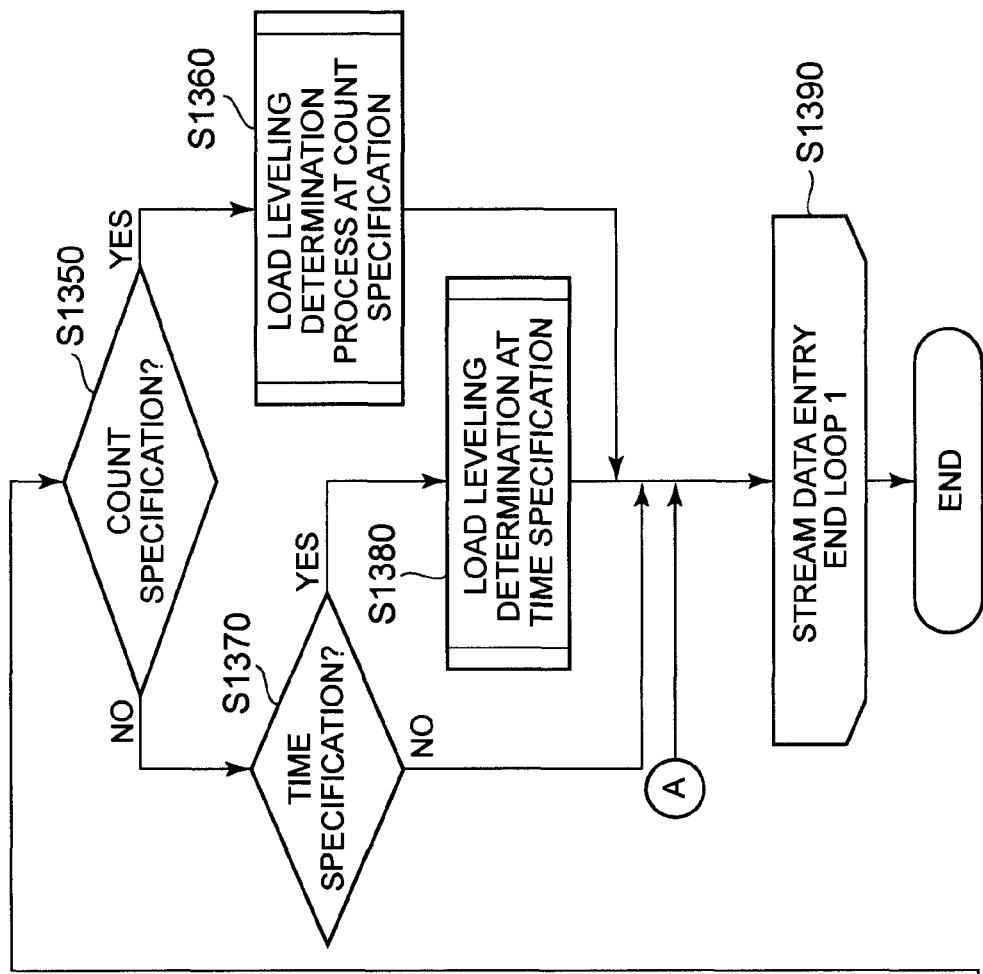
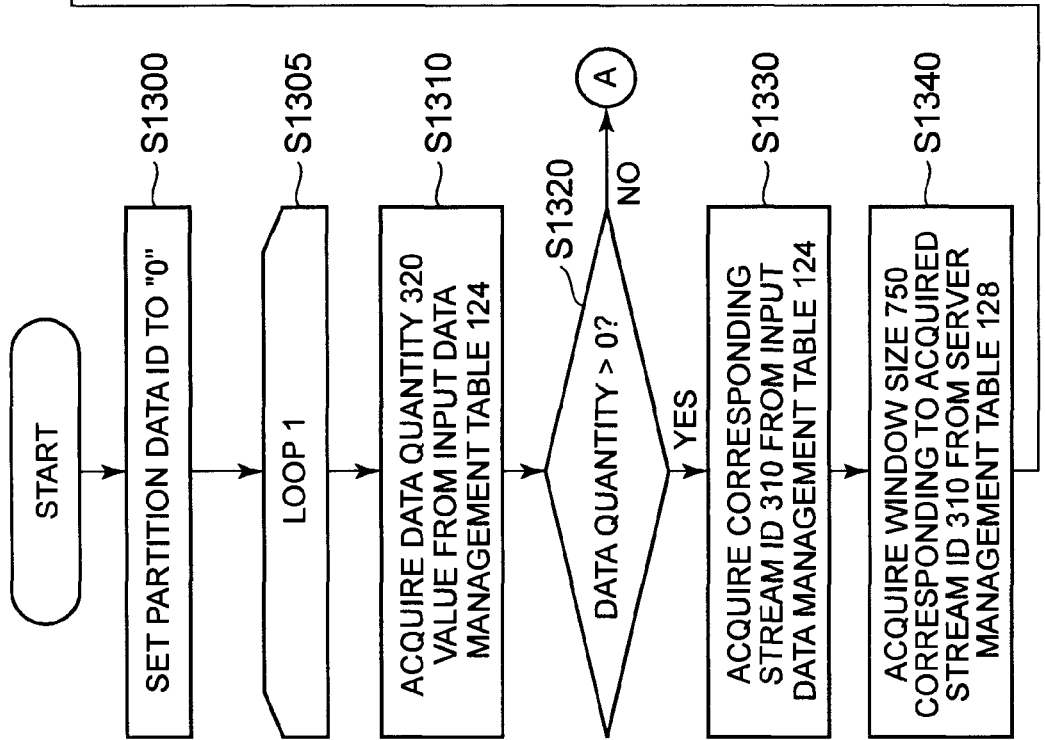

| SERVER NAME | IP ADDRESS | STREAM ID | QUERY ID | AUXILIARY DATA QUANTITY |
|---|---|---|---|---|
| SERVER A | 192.168.1.4 | S1 | Q1 | 20 DATA |
| | | S2 | Q2 | 60 SECONDS |

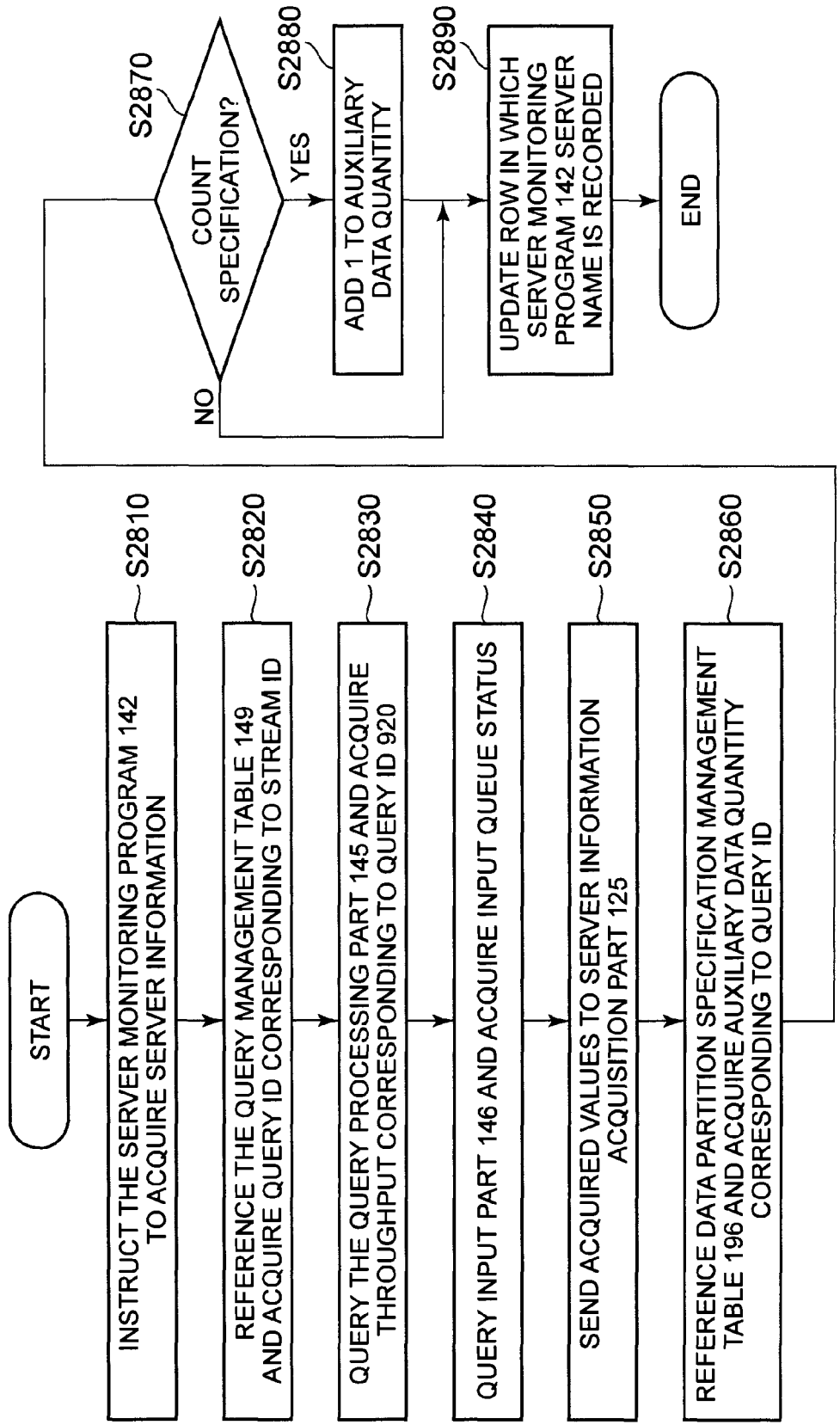

DISTRIBUTED PROCESSING OF PARTITIONED STREAM DATA INCLUDING DATA ELEMENT GROUP AND END DATA

CROSS-REFERENCE TO PRIOR APPLICATION

This application relates to and claims priority from Japanese Patent Application No. 2009-285785, filed on Dec. 16, 2009, the entire disclosure of which is incorporated herein by reference.

BACKGROUND

The present invention generally relates to stream data processing technology.

As can be seen from the small-lot stock trading in the finance industry, and the widespread use of RFID (Radio Frequency Identification) and sensors in the manufacturing/distribution industry, the quantity of data being handled in various industries has increased dramatically in recent years. In addition, in numerous cases the significance lies in making immediate use of the data that is being handled, as seen in securities trading in the finance industry and in the real-time tracing/monitoring of individual units in the manufacturing/distribution industry. For this reason, data processing systems that are capable of processing large quantities of data at high speed are required.

A stream data processing system has been proposed as a system for processing large quantities of data at high speed (for example, Japanese Patent Application Laid-open No. 2006-338432). The stream data processing system will be explained hereinbelow by comparing it to an ordinary database management system (hereinafter DBMS). Note that individual data comprising the stream data will be called a "data element".

In a DBMS, data to be analyzed is stored in a secondary storage apparatus (for example, a disk device such as a hard disk drive) one time, and thereafter the data is collectively processed using a batch process or the like. By contrast, in a stream data process, the nature of the processing, such as totalization or analysis, is registered in the system as a query beforehand, and processing is carried out consecutively at the point in time at which the data arrives at the system's primary storage apparatus (for example, a volatile memory). In accordance with this, the stream data processing system is able to process a large quantity of consecutive time-sequence data that arrives from one moment to the next at high speed (hereinafter, stream data).

As an example of a query that is registered in the stream data processing system, a CQL (Continuous Query Language) may be cited (for example, Japanese Patent Application Laid-open No. 2006-338432). In addition to a processing definition, the CQL also specifies a range of data that is targeted for processing. This data range is generally called a "window".

As methods of specifying the size of the window, there are a count specification and a time specification. For example, in the case of a count specification, a specification like "most recent 10 counts" is carried out, and in the case of a time specification, a specification like "most recent one hour" is carried out. That is, in the count specification, the number of data elements being targeted for processing is specified, and in the time specification, the time of the range of time stamps of the data elements being targeted for processing is specified.

The stream data processing system, as described hereinabove, consecutively processes data elements equivalent to the size of the window each time data arrives. It is desirable that a conventional load-leveling technique, such as a round robin or the like be capable of being applied to a stream data processing system like this as well.

However, it is not possible to simply apply a conventional load-leveling method to the stream data processing system. That is, it is not possible to realize load leveling by simply partitioning and distributing the stream data to a plurality of stream data processing servers (computers for executing a program that carries out stream data processing) either uniformly or in accordance with the throughput of the stream data processing server (shortened to "server" hereinafter).

An example in which a conventional load-leveling method is not able to be simply applied to the stream data processing system is processing in a case where a data range has been specified in accordance with a sliding window, in which endpoints are not specified for the stream data, and a landmark window, in which one endpoint is specified for the stream data (For example, Lukasz Golab and M. Tamer Ozsu, "Issues in Data Stream Management." SIGMOD Rec, Vol. 32, No. 2, pp. 5-14, 2003).

Specifically, a case in which SUM processing is performed on the most recent 3 data elements, which data elements possess a value that is a natural number N (that is, N is an integer that is equal to or larger than 1), using a sliding window will be described below.

Processing is performed when a value "1" arrives in one server, and the operation result in the server is the value "1". When a value "2" arrives in the server, the value "2" is added to the value "1" of the previous result, and the resulting value becomes "3". When a value "3" arrives in the server, 3 is added to the value "3" of the previous result, and the resulting value becomes "6". When a value "4" arrives in the server, the value "1", which moves outside the sliding window range, is subtracted and, in addition, the arrived value "4" is added to the value "6" of the previous result, making the resulting value "9". The server repeats the above-described difference processing each time data arrives, and the values of the operation results become "1", "3", "6", "9", "12", "15", . . . in that order.

By contrast, two servers will be used in an attempt to perform SUM processing by partitioning the stream data into individual data elements and mutually distributing these data elements. A value "1" arrives in a first server, processing is performed at this time and the resulting value is "1". A value "2" arrives in a second server, processing is performed at this time and the resulting value is "2". A value "3" arrives in the first server, the value "3" is added to the value "1" of the previous result at this time, and the resulting value becomes "4". This difference in processing is alternately repeated in each server, and the values of the operation results become "1", "2", "4", "6", "9" . . . in that order, clearly differing from the results obtained via the processing carried out by a single server.

SUMMARY

As described above, a conventional load-leveling method cannot simply be applied to the load leveling of a stream data processing system. For this reason, to realize load leveling in the above system, the system developer must define a query while taking into account the stream data quantity and the system configuration. For example, the system developer must couple the servers together in series and define a query by taking into account the reduction of the quantity of the stream data in accordance with the first-stage server performing filtering or aggregation processing and the second-stage server performing the high-load business processing.

Accordingly, an object of the present invention is to make it possible to define a query in a system in which stream data processing load leveling is carried out without the system developer taking into account the stream data quantity and system configuration.

A plurality of computers are coupled to a stream data processing apparatus. The stream data processing apparatus distributes a plurality of partition data created on the basis of the stream data to the plurality of computers. A single partition data is created as follows. That is, the stream data processing apparatus acquires from the stream data a group of data elements comprising a plurality of data elements based on the throughput of the partition data destination computer, and decides an auxiliary data part of this data element group on the basis of a predetermined value. The stream data processing apparatus creates a partition data comprising the acquired data element group and END data, and sends the partition data to the destination computer. The data element group comprises the auxiliary data part and a result usage data part.

The stream data that the stream data apparatus receives from a stream data source is stored in a storage resource, making it possible to create the partition data based on the stream data inside this storage resource. The storage resource may either be inside or outside of the stream data processing apparatus.

According to the present invention, it is possible for the system developer to define a query in a system in which stream data processing load leveling is carried out without taking into consideration the stream data quantity and system configuration.

BRIEF DESCRIPTION OF THE DRAWINGS

FIG. 2 shows an example of a stream data status table stored in an input data accumulation part 123;

FIG. 3 shows an example of an input data management table 124;

FIG. 4 shows an example of an input stream definition;

FIG. 5 shows an example of a query 510 in which a window size has been defined in accordance with a count specification;

FIG. 6 shows an example of a query 610 in which a window size has been defined in accordance with a time specification;

FIG. 9 shows an example of a query management table 149;

FIG. 10 shows an example of a partition data management table 150;

FIG. 11 shows an example of a processing order control table 176;

FIG. 13 is a flowchart showing the processing for determining whether an input data management part 126 is to carry out load leveling;

FIG. 28 is a flowchart showing the steps for upgrading the server management table 128 in the second embodiment.

DETAILED DESCRIPTION OF THE EMBODIMENTS

Figure 1:
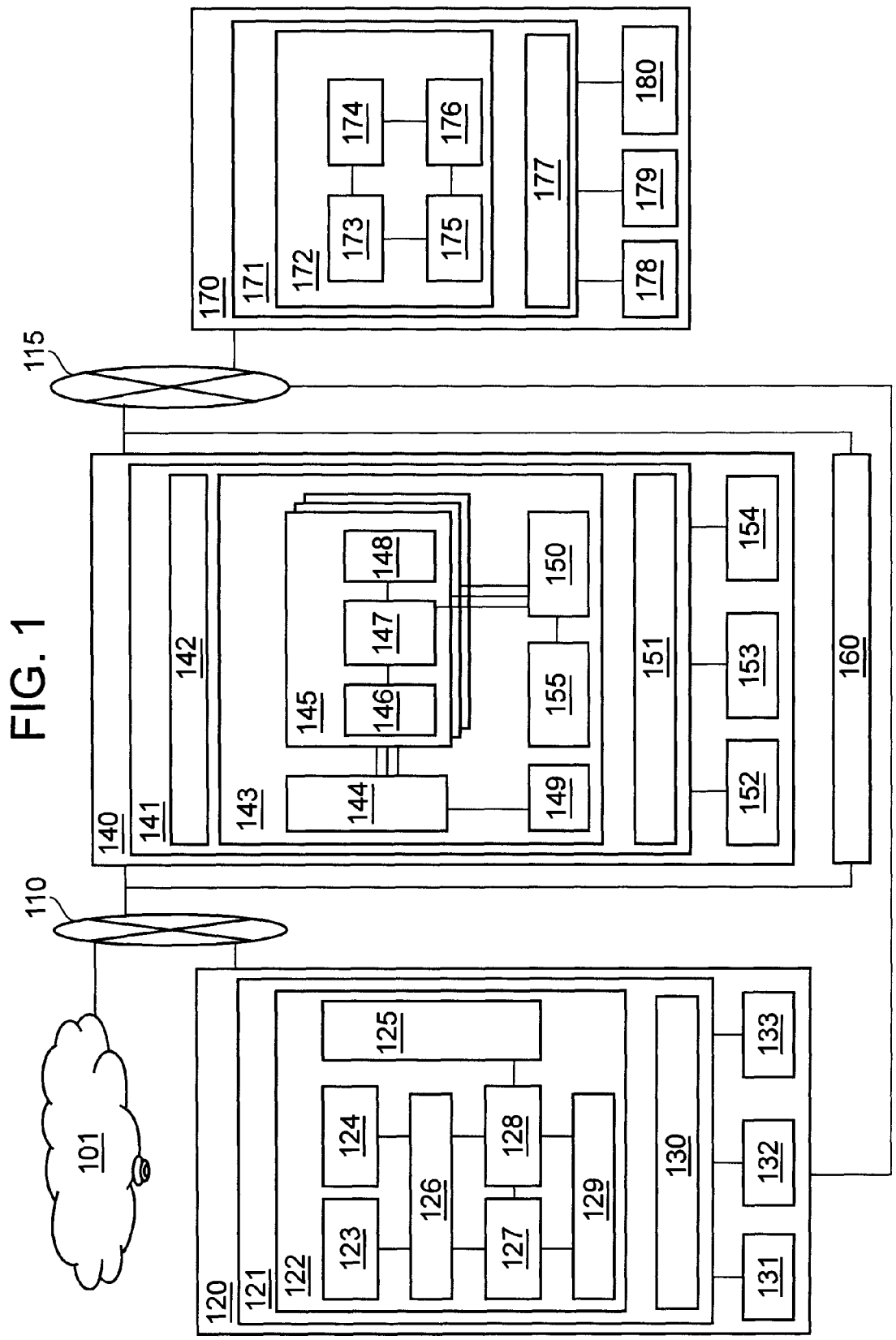
FIG. 1 is a block diagram showing the overall configuration of a stream data processing system related to a first embodiment of the present invention.

A number of embodiments of the present invention will be explained below by discretionarily referring to the drawings. In so doing, time will be expressed in terms of old/new. For example, a first time is older than a second time will signify that the first time is more in the past than the second time. Alternatively, a first time is newer than a second time will signify that the first time is more in the future than the second time.

First Embodiment

An overview of the first embodiment of the present invention will be explained. Note that in the following explanation, the individual data comprising the stream data will be called a "data element". A data element, for example, comprises a time stamp, which is information denoting a time generated by a stream data source, and a value that constitutes the target of processing in accordance with a query. The data element, for example, is data called a "tuple".

A stream data processing system related to the first embodiment comprises a plurality of computers. The plurality of computers include an input control computer, a plurality of server computers, and an output control computer. The input control computer and the output control computer may be integrated (may be the same computer).

The input control computer is the computer in which the stream data processing apparatus related to the first embodiment of the present invention is applied.

The input control computer comprises a communication interface and a controller (hereinafter, the input control controller) that is coupled to the communication interface. The input control controller comprises a memory and a processor (for example, a CPU (Central Processing Unit), and operates in accordance with the processor reading and executing an input data control program from the memory. However, the input control controller may comprise a hardware circuit, and a portion of the processing performed by the processor may be executed by the hardware circuit instead of the processor.

Each server computer comprises a communication interface, and a controller (hereinafter, the server controller) that is coupled to the communication interface. The server controller comprises a memory and a processor (for example, a CPU), and operates in accordance with the processor reading and executing a stream data processing program from the memory. However, the server controller may comprise a hardware circuit, and a portion of the processing performed by the processor may be executed by the hardware circuit instead of the processor.

The output control computer comprises a communication interface and a controller (hereinafter, the output control controller) that is coupled to the communication interface. The output control controller comprises a memory and a processor (for example, a CPU), and operates in accordance with the processor reading and executing a processing result control program from the memory. However, the output control controller may comprise a hardware circuit, and a portion of the processing performed by the processor may be executed by the hardware circuit instead of the processor.

A plurality of partition data is created on the basis of the stream data, and the plurality of partition data is distributed to the plurality of server computers. In accordance with this, the load related to processing the stream data is distributed among the plurality of server computers.

"Partition data" here comprises an auxiliary data part, a result usage data part, and an operation end notification data part, and these occur in succession. The auxiliary data part is the front portion of the partition data, the operation end notification data part is the rear portion of the partition part, and the result usage data part is the middle portion that is sandwiched between the auxiliary data part and the operation end notification data part. The auxiliary data part and the result usage data part are comprised of one or more data elements of the stream data, and the operation end notification data part is comprised of data (END data) that signifies the end of the partition data. The value of the data element included in the result usage data part may be processed by the server computer, and, in addition, may be outputted as the processing result from this server computer. Alternatively, the value of the data element included in the auxiliary data part is processed by the server computer, but is not outputted as the processing result of this server computer.

The explanation will continue below with the destination of a certain partition data being a certain server computer (hereinafter the target server). The END data may be counted as a data element, but to make the following explanation easier to understand, it will be assumed that the END data is not counted as a data element.

The input control controller receives the stream data from the stream data source via the communication interface, and stores the received stream data in a storage resource. The storage resource may be inside or outside of the input control computer. The input control controller regularly (or irregularly) monitors the amount of data in the stream data (or the amount of data and the accumulation length of time of the stream data), and determines whether or not load leveling will be executed. Specifically, for example, the input control controller determines whether or not load leveling will be executed based on the amount of data in the stream data, the throughput (server throughput) showing the processing capability of the target server, and the size (window size) of the data range defined in the query. An input queue status may be taken into account in this determination. The input queue status is the number of unprocessed data elements that exist in the queue (the queue in which the data elements are inputted) of the target server.

In a case where it has been determined that load leveling will be executed, the input control controller decides the amount of data for the partition data (the number of data elements comprising the partition data) based on the server throughput of the target server (or the server throughput and the input queue status). Then, the input control controller acquires data elements equivalent to the decided data quantity from the stream data accumulating in the storage resource. Two or more consecutive data elements are acquired here. These two or more data elements will be referred to as the "data element group" hereinbelow.

Next, the input control controller decides the auxiliary data part of the data element group based on the window size defined in the query of the target server (that is, decides the number of data elements that make up the auxiliary data part from the first data element of the data element group). The input control controller determines that the remainder of the data element group is in the result usage data part.

Lastly, the input control controller appends the END data after the data element at the end of the data element group. In accordance with this, the partition data is complete. The input control controller provides the completed partition data with a partition data ID (hereinafter, the partition data ID), and sends the partition data to which the partition data ID has been provided to the target server.

Furthermore, after deciding the auxiliary data part and the result usage data part, the input control controller sends to the target server at an arbitrary timing (for example, either prior to sending the partition data or together with the partition data) information that makes it possible to specify the first data element of the one or more data elements belonging to the result usage data part (hereinafter, result usage specification information). In other words, the result usage specification information makes it possible to specify the data elements that belong to the auxiliary data part. That is, the target server knows that the data elements belonging to the auxiliary data part extend from the first data element of the two or more data elements included in the partition data up to the data element immediately prior to the date element specified from the result usage specification information, and that the data element specified from the result usage specification information and the data element immediately after this data element are the data elements that belong to the result usage data part. As will be explained below, the time stamp of the oldest data element from among the one or more data elements that belong to the result usage data part may be used as an example of the result usage specification information, but the present invention is not limited to this, and other types of information, for example, the number of data elements belonging to the auxiliary data part and at the least one of the time stamps in the data element at the end of the auxiliary data part may be used.

The server controller of the target server receives the partition data from the input control controller and executes the processing of this partition data. During process execution, the value inside the data element belonging to the auxiliary data part is processed, but is destroyed without being outputted as the processing result, and the value inside the data element belonging to the result usage data part is processed, and, in addition, is sent to the output control controller as the processing result. The data element belonging to the auxiliary data part and the data element belonging to the result usage data part are clear from the above-mentioned result usage specification information. In a case where the server controller detects the END data, the server controller recognizes that the processing of the auxiliary data part and the result usage data part has been completed, and sends the END data to the output control controller.

The output control controller manages the processing results from the respective serve computers for each set of a query and a partition data ID. Upon receiving the END data, the output control controller sends the processing result being managed in accordance with a request from the user.

The first embodiment will be explained in detail below. The number of server computers is given as two below, but there may be more than two server computers. Further, it is supposed that the input control controller, the server controller, and the output control controller comprise a CPU and a primary storage apparatus. Also, to prevent the explanation from becoming redundant, it is supposed that processing, which is performed in accordance with the CPU executing a computer program, is carried out by this computer program.

FIG. 1 is a block diagram of the overall configuration of the stream data processing system related to the first embodiment of the present invention.

The stream data processing system comprises an input control computer 120 for partitioning stream data from a stream data source 101 and sending this stream data, a first and a second server computer 140 and 160 for executing stream data processing, and an output control computer 170 for controlling the processing result of the server computer. The stream data source 101, the input control computer 120, and the first and second server computers 140 and 160 are coupled to a communication network (hereinafter, network) 110, and the first and second server computers 140 and 160, and the output control computer 170 are coupled to a network 115. The networks 110 and 115 may be integrated.

The stream data source 101 is a system that constitutes the source of the stream data. The stream data is time-sequence data that is created from one moment to the next, and, for example, is POS (Point Of Sales) data, securities trading data, and temperature and/or humidity data obtained from a sensor. The stream data source 101 sends the stream data to the input control computer 120 via the network 110.

The input control computer 120 comprises a primary storage apparatus 121, a CPU 131, a secondary storage apparatus 132, and a communication interface 133. An operating system 130 and an input data control program 122 are stored in the primary storage apparatus 121. The operating system 130 and an input data control program 122 are installed in the secondary storage apparatus 132 via either a flexible storage medium or the network 110, and after being loaded into the primary storage apparatus 121, are executed by the CPU 131. This same thing also holds true for the programs in the other computers shown in FIG. 1.

The input data control program 122 comprises an input data accumulation part 123 that stores stream data sent from the stream data source 101, an input data management part 124 that stores the status of the stream data stored in the input data accumulation part 123, an input data management part 126 that regularly (or irregularly) monitors the input data accumulation part 123 and determines whether load leveling will be carried out, an input data partitioning part 127 that creates partition data by partitioning the stream data accumulated in the input data accumulation part 123, a server information acquisition part 125 that acquires the server computer status from each server computer, a server management table 128 that stores server information obtained from the server information acquisition part 125, and a data sending part 129 that sends the partition data created by the input data partitioning part 127 to the respective server computers.

The first server computer 140 comprises a primary storage apparatus 141, a CPU 152, a secondary storage apparatus 153, and a communication interface 154. The primary storage apparatus 141 stores an operating system 151, a stream data processing program 143 that performs processing with respect to the stream data, and a server monitoring program 142 for monitoring the stream data processing program 143.

The stream data processing program 143 comprises a data receiving part 144 that receives partition data sent from the data sending part 129, a query management table 149 that manages a query registered in the server computer 140, a query processing part 145 (comprising an input part 146, a processing execution part 147, and an output part 148) that executes the registered query, a partition data management information receiving part 155 that acquires partition data management information from the data sending part 129, and a partition data management table 150 that stores the acquired partition data management information.

The configuration of the second server computer 160 is the same as that of the first server computer 140. That is, the second server compute 160 also comprises a CPU, a second storage apparatus, a communication interface, and a primary storage apparatus, and the primary storage apparatus stores an operating system, a stream data processing program, and a server monitoring program.

The output control computer 170 comprises a primary storage apparatus 171, a CPU 178, a secondary storage apparatus 179, and a communication interface 180. The primary storage apparatus 171 stores an operating system 177 and a processing result control program 172.

The processing result control program 172 comprises a processing result receiving part 173 that receives a processing result from the stream data processing program 143, a processing result management part 174 that stores the processing result in the secondary storage apparatus 179 (or the primary storage apparatus 171) and sends the processing result to a user program (for example, an application program not shown in the drawing), a processing order receiving part 175 that acquires processing order information from the data sending part 129, and a processing order control table 176 that stores the processing order information and the processing result storage location information.

Next, the flow of processing for load leveling in the stream data processing system will be explained using FIG. 1.

The stream data source 101 sends the stream data to the input data accumulation part 123 via the network 110. The input management part 126 discerns the status of the stream data by regularly monitoring the input data accumulation part 123, and updates the input data management table 124 to reflect the discerned status. In addition, the input data management part 126 references the input data management table 124 and the server management table 128 in which is stored the server information that the server information acquisition part 125 acquired from the server monitoring program 142, and determines whether or not to execute load leveling.

In a case where it has been determined to execute load leveling, the input data management part 126 instructs the input data partitioning part 127 to create the stream data (hereinafter, called the "partition data") to be sent to the respective server computers.

The input data partitioning part 127 references the server management table 128, decides the quantity of partition data to be sent to each server computer, acquires the stream data to be sent to the respective server computers from the input data accumulation part 123 and provides a partition data ID, and creates the partition data (the content of the partition data sent to the respective server computers will be explained in detail below).

After the partition data has been created, the data sending part 129 first sends the partition data management information to the partition data management information receiving part 155 via either network 110 or 115, and sends the processing order information to the processing order receiving part 175. After the information has been sent, the partition data management information receiving part 155 updates the partition data management table 150, and the processing order receiving part 175 updates the processing order control table 176. Next, the data sending part 129 sends the created partition data to the server computer 140 via the network 110. Lastly, the data sending part 129 adds the window size (that is, the size of the data range) corresponding to the partition data, and deletes the sent partition data from the input data accumulation part 123. However, the data sending part 129 does not delete all of the partition data; it does not delete K data elements at the end of the consecutive plurality of data elements that configure the partition data. K is the number of data elements included in the auxiliary data part described hereinbelow. That is, the data sending part 129 does not delete the data elements in the rear side portion of the partition data, leaving the same number of data elements as the K number of data elements configuring the auxiliary data part. This is because the K data elements left behind become the data elements in the auxiliary data part of the subsequent partition data.

The data receiving part 144 receives the partition data via the network 110. The data receiving part 144 references the query management table 149, selects the query processing part 145 corresponding to the received partition data, and inputs the partition data into the input part 146 of the query processing part 145. The input part 146 sequentially inputs the inputted partition data into the processing execution part 147, and the processing execution part 147 executes the processing defined in the query. After executing processing, the processing execution part 147 references the partition data management table 150, and determines whether or not to output the data (the processing result data) denoting the result of the processing to the output part 148. In a case where it has been determined to perform the output, the processing result data is outputted from the output part 148 to the processing result receiving part 173 via the network 115. The processing result receiving part 173 receives the processing result data, and outputs the received processing result data to the processing result management part 174. The processing result management part 174 updates the processing order control table 176 after storing the processing result data in either the secondary storage apparatus 179 or the primary storage apparatus 172.

When the data denoting the end of the partition data (hereinafter, the END data) is input into the processing execution part 147 from the input part 146, the processing execution part 147 outputs the END data to the output part 148 without performing the processing defined in the query. The output part 148 receives the END data, and sends this END data to the processing result receiving part 173 via the network 115. The processing result receiving part 173 receives the END data, and outputs this END data to the processing result management part 174. The processing result management part 174 receives the END data, and updates the processing order control table 176.

The flow of processing of load leveling in the stream data processing system of the first embodiment has been explained above. In the above explanation, an example was given in which the partition data is sent to the first server computer 140, but in a case where the partition data is sent to the second server computer 160, the same processing as that performed in the first server computer 140 is carried out in the second server computer 160.

FIG. 2 shows an example of a stream data status table stored in the input data accumulation part 123.

The stream data status table stores a stream ID 210, a time stamp 220, and a value 230 for each type of stream data.

As used here, "stream ID" is a unique ID for identifying a type of stream data, and normally is set by the user using a unique character string value.

Each data element of the stream data comprises a time stamp and a value. That is, a data element is accumulated in the stream data status table for each stream ID 210. The time stamp 220 included in the table is the time stamp that comprises the data element, and this time stamp shows the creation time of this data element. The value 230 included in the table is the value that comprises the data element, and this value is used in the operation on the stream data processing.

According to the example of FIG. 2, "S1" is stored as the stream ID 210, and a data element having a time stamp 220 of "10:00:00" and a value 230 of "30", a data element having a time stamp 220 of "10:00:01" and a value 230 of "24", and a data element having a time stamp 220 of "10:00:02" and a value 230 of "45", are respectively stored as the data elements of the stream data of this stream ID "S1".

FIG. 3 shows an example of the input data management table 124.

The input data management table 124 comprises a data quantity 320 and a data accumulation time 330 for each stream ID 310. The data quantity 320 is information denoting the total number of data elements. The data accumulation time 330 is information denoting the difference between the time stamp of the oldest data element and the time stamp of the newest data element.

The input data management part 126 regularly updates the input data management table 124 on the basis of the stream data status table stored in the input data accumulation part 123, and stores the data quantity 320 and data accumulation time 330 of the stream data for each stream ID 310. The stream data quantity 320 is acquired by counting the number of stream data that exist in each stream ID 210 of the input data accumulation part 123. The data accumulation time 330 is acquired using the difference between the time stamps of the newest stream data and the oldest stream data among the stream data that exists in each stream ID 210 of the input data accumulation part 123.

According to the example of FIG. 3, "S1" is recorded as the stream ID 310, and "13500 units" and "10 seconds" are respectively recorded as the data quantity 320 and the data accumulation time 330 of this stream ID "S1".

FIG. 4 shows an example of an input stream definition.

The input stream definition 410 is registered in the first server computer 140 and the second server computer 160. The input stream definition 410 registered in the server computer 140 (160) comprises information related to the stream data inputted to this server computer 140 (160), for example, information denoting the type of stream data and the attribute of the value.

According to the example of FIG. 4, the input stream definition 410 shows that the stream ID of the stream data (input stream) received by the data receiving part 144 of the server computer 140 (160) is "S1" (and "S2"), and that the value of each data element of this stream data is an integer, and, in addition, is the variable "value" (and the variable "temperature").

FIGS. 5 and 6 are examples of queries registered in the first server computer 140 and the second server computer 160. The query, for example, is based on the CQL (Continuous Query Language).

FIG. 5 shows an example of a query 510 in which a window size is defined by a count specification. The query 510 denotes that the query ID is "Q1", and that the processing is an operation for computing the total value of the values of the variable value for the most recent 10 data elements corresponding to the stream ID "S1". "ROWS 10" in the query 510 signifies the most recent 10 data elements, and this corresponds to the window size.

FIG. 6 shows an example of a query 610 in which the window size is defined by a time specification. The query 610 denotes that the query ID is "Q2", and that the processing is an operation for computing the average value of the values of the variable temperature of the most recent 30 seconds worth of data elements corresponding to the stream ID "S2". "RANGE 30 seconds" in the query 610 signifies the most recent 30 seconds worth of data elements, and this corresponds to the window size.

Figures 7, 8:
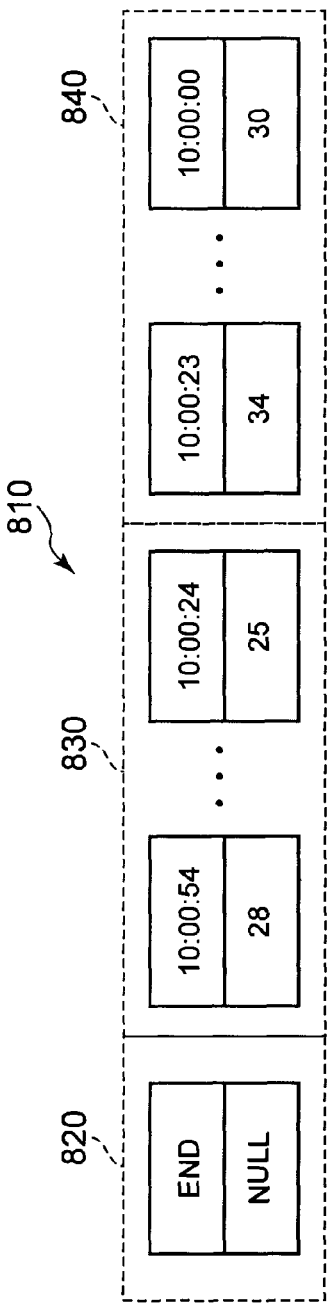
FIG. 7 shows an example of a server management table 128.
FIG. 8 shows the configuration of partition data.

FIG. 7 shows an example of the server management table 128.

The server management table 128 comprises a server name 710, an IP address 720, a stream ID 730, a query ID 740, a window size 750, a throughput 760, and an input queue status 770 for each server computer.

The server name 710 and the IP address 720 are information denoting the name and IP address of the server computer. The stream ID 730 is the stream ID registered in the server computer. The query ID 740 and the window size 750 are information denoting the query ID and window size of a query corresponding to the stream ID registered in the server computer. The throughput 760 is information denoting the average processing capability (throughput) of the server computer that corresponds to the query ID. The throughput denotes the number of data elements that is processed per unit of time (for example, one second). The input queue status 770 denotes the number of data elements (unprocessed date elements) that are waiting in the queue (the input queue) managed by the input part 146 of the query processing part 145 corresponding to the query ID.

According to the example of FIG. 7, "Server A", which is the server name of the first server computer, and "192.168.1.4", which is the IP address of the first server computer 140, are respectively recorded as the server name 710 and the IP address 720. In addition, in the row comprising the "Server A", "S1" and "S2", which are the stream IDs registered in the first server computer 140, are respectively recorded as the stream ID 730.

The query ID "Q1" and the window size "10 counts" corresponding to the stream ID "S1" are respectively recorded as the query ID 740 and the window size 750 in the row comprising the stream ID "S1" with respect to the server name "Server A". The throughput "1000 counts/second" and the input queue status "50 counts" are respectively recorded as the throughput 760 and the input queue status 770 in the row comprising the query ID "Q1" with respect to the server name "Server A".

In addition, the query ID "Q2" and window size of "30 seconds" corresponding to the stream ID "S2" are respectively recorded as the query ID 740 and the window size 750 in the row comprising the stream ID "S2" with respect to the server name "Server A". Further, the throughput "50 counts/second" and the input queue status "200 counts" are respectively recorded as the throughput 760 and the input queue status 770 in the row comprising the query ID "Q2" with respect to the server name "Server A".

FIG. 8 shows the configuration of the partition data.

The partition data 810 is configured from an auxiliary data part 840, a result usage data part 830, and an operation end notification data part 820.

The result usage data part 830 is configured from one or more data elements in the stream data acquired from the input data accumulation part 123. The data elements included in this data part 830 are processed by the processing execution part 147 and outputted to the output part 148.

The auxiliary data part 840 is configured from one or more data elements in the stream data acquired from the input data accumulation part 123. The data elements included in this data part 840 are provided in the portion in front of the result usage data part 830. The data elements included in this data part 840 are processed by the processing execution part 147, but are not outputted to the output part 148.

The operation end notification data part 820 denotes the end of the data that is targeted for processing by the processing execution part 147, and is provided in the portion to the rear of the result usage data part 830. This data part 820 is configured from the above-described END data. The END data is outputted to the output part 148 after the processing of the auxiliary data part 840 and the result usage data part 830 without being processed by the processing execution part 147.

According to FIG. 8, the auxiliary data part 840 is followed by the result usage data part 830, and the result usage data part 830 is followed by the operation end notification data part 820.

According to the example of FIG. 8, data elements from the data element with the time stamp of "10:00:00" and the value "30" to the data element with the time stamp "10:00:23" and the value "34" exist in the auxiliary data part 840. The data elements from the data element with the time stamp of "10:00:24" and the value "25" to the data element with the time stamp "10:00:54" and the value "28" exist in the result usage data part 830. The END data with the time stamp "END" and the value "NULL" exists in the operation end notification data part 820.

FIG. 9 shows an example of the query management table 149.

The query management table 149 comprises a query ID 920 and a window size 930 for each stream ID 910.

The stream ID 910 is the stream ID that is registered in the server computer. The query ID 920 and the window size 930 are the query ID and the window size corresponding to the stream ID that is registered in the server computer.

According to the example of FIG. 9, the stream IDs "S1" and "S2" that are registered in the first server computer 140 are respectively recorded as the stream ID 910. The query ID "Q1" and "10 counts", which is the window size thereof, are respectively recorded in the row in which the stream ID "S1" is recorded as the query ID 920 and the window size 930. The query ID "Q2" and "30 seconds", which is the window size thereof, are respectively recorded in the row in which the stream ID "S2" is recorded as the query ID 920 and the window size 930.

FIG. 10 shows an example of the partition data management table 150.

The partition data management table 150 comprises a partition data ID 1020 and an operation-targeted start time 1030 for each query ID 1010.

The query ID 1010 is the query ID of the query that is registered in the server computer. The partition data ID 1020 is a unique ID that the data sending part 129 provides to the partition data. The operation-targeted start time 1030 is the oldest time stamp in the result usage data part 830 of the partition data 810.

According to the example of FIG. 10, the query IDs "Q1" and "Q2", which are registered in the first server computer 140, are respectively recorded as the query ID 1010. In the row in which the query ID 1010 is recorded, "000001" is recorded as the partition data ID 1020, and, in addition, "10:00:24" is recorded as the operation-targeted start time 1030.

FIG. 11 shows an example of the processing order control table 176.

The processing order control table 176 comprises a partition ID 1120, an END sent YES/NO 1130, and a processing result storage location 1140 for each query ID 1110.

The query ID 1110 is the ID of the query that is registered in the server computer. The partition data ID 1120 is a unique ID that the data sending part 129 provides to the partition data. The END sent YES/NO 1130 is information denoting whether or not the operation end notification data part 820 of the partition data 810 has been sent. The processing result storage location 1140 is information denoting the address of the storage area that stores the processing result received from the processing result receiving part 173.

According to the example of FIG. 11, query IDs "Q1" and "Q2" of the queries that are registered in the first server computer 140 are respectively recorded as the query ID 1110. The partition data IDs "000001" and "000002" are respectively recorded in the row comprising the query ID "Q1" as the partition data ID 1120. In the row comprising the partition data ID "000001", the value "Yes", which denotes that the operation end notification data part 820 has been sent, is recorded as the END sent YES/NO 1130, and, in addition, "0x384621F", which is the address of the storage area in which the processing result of the partition data under partition data ID "000001" is stored, is recorded as the processing result storage location 1140. Alternatively, in the row comprising the partition data ID "000002", the value "NO", which denotes that the operation end notification data part 820 has not been sent, is recorded as the END sent YES/NO 1130, and, in addition, the value "−", which shows that there is no processing result of the partition data under partition data ID "000002", is recorded as the processing result storage location 1140.

The processing performed in this embodiment will be explained below.

Figure 12:
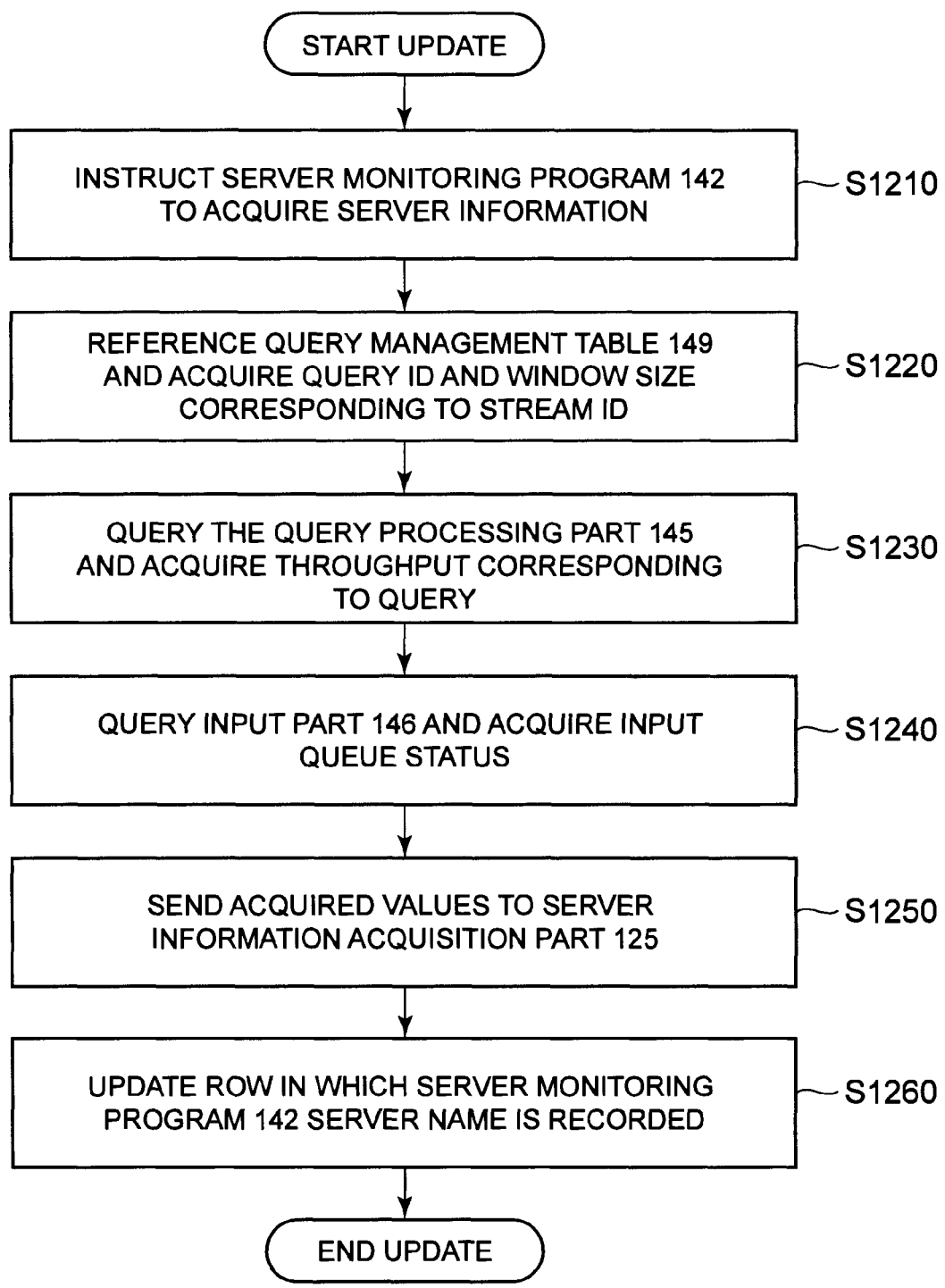
FIG. 12 is a flowchart showing the steps for a server information acquisition part 125 to update the server management table 128.

FIG. 12 is a flowchart showing the steps by which the server information acquisition part 125 updates the server management table 128.

First, the server information acquisition part 125 communicates via the network 110 with the server monitoring program 142, and instructs this program 142 to acquire server information (Step 1210).

Next, the server monitoring program 142 references the query management table 149, and acquires the stream ID 910, the query ID 920, and the window size 930 (Step 1220).

Next, the server monitoring program 142 queries the query processing part 145, and acquires the throughput corresponding to the acquired query ID 920 (Step 1230).

Next, the server monitoring program 142 queries the input part 146 that exists in the query processing part 145 corresponding to the acquired query ID 920, and acquires the input queue status (Step 1240).

Next, the server monitoring program 142 sends the stream ID 910, the query ID 920, the window size 930, the throughput and the input queue status acquired in Steps 1220 through 1240 to the server information acquisition part 125 via the network 110 (Step 1250).

Lastly, the server information acquisition part 125 updates the row in the server management table 128 in which is recorded the name of the server in which exists the server monitoring program 142 that was instructed to acquire server information in Step 1210 (Step 1260). That is, the stream ID 910, the query ID 920, and the window size 930 acquired in Step 1220 are recorded as the stream ID 730, the query ID 740 and the window size 750, the throughput acquired in Step 1230 is recorded as the throughput 760, and the input queue status acquired in Step 1240 is recorded as the input queue status 770.

FIG. 13 is a flowchart showing the processing by which the input data management part 126 specifies whether load leveling is to be performed.

First, the input data partitioning part 127 sets the value of the partition data ID to "0" (Step 1300). That is, the value of the partition data ID is reset. Note that a partition data ID exists for each stream ID 310.

While the stream data is continuously being inputted into the input data accumulation part 123 (Step 1305), the input data management part 126 repeatedly performs the processing from Step 1310 through Step 1380.

That is, the input data management part 126 acquires the data quantity 320 from the input data management table 124 (Step 1310).

In a case where the acquired data quantity 320 denotes a number that is larger than "0" (Step 1320: YES), the input data management part 126 acquires the corresponding stream ID 310 from the input data management table 124 (Step 1330). In a case where the acquired data quantity 320 is "0" (Step 1320: NO), a determination is made that load leveling is not necessary because stream data has not been accumulated.

Next, the input data management part 126 acquires the window size 750 corresponding to the acquired stream ID 310 from the server management table 128 (Step 1340).

Next, the input data management part 126 determines whether or not the acquired window size 750 is a count specification (Step 1350).

In a case where the determination result of Step 1350 is YES, the input data management part 126 carries out a load leveling determination for a count specification (Step 1360).

In a case where the determination result of Step 1350 is NO, the input data management part 126 determines whether or not the window size 750 acquired in Step 1340 is a time specification (Step 1370).

In a case where the determination result of Step 1370 is YES, the input data management part 126 carries out a load leveling determination for a time specification (Step 1380).

When the inputting of the stream data into the input data accumulation part 123 has been completed, the load leveling determination process ends (Step 1390).

The details of Step 1360 will be described using FIGS. 14 and 16. In a case where the determination result of Step 1350 is YES, the input data management part 126 will perform the processing shown in FIG. 14 when the input queue status 770 is not valid information (when the input queue status 770 is an invalid value such as "−"), and will perform the processing shown in FIG. 16 when the input queue status 770 is valid information (when the input queue status 770 is not an invalid value such as "−").

The details of Step 1380 will be described using FIGS. 15 and 17. In a case where the determination result of Step 1370 is YES, the input data management part 126 will perform the processing shown in FIG. 15 when the input queue status 770 is not valid information (when the input queue status 770 is an invalid value such as "−"), and will perform the processing shown in FIG. 17 when the input queue status 770 is valid information (when the input queue status 770 is not an invalid value such as "–").

Figure 14:
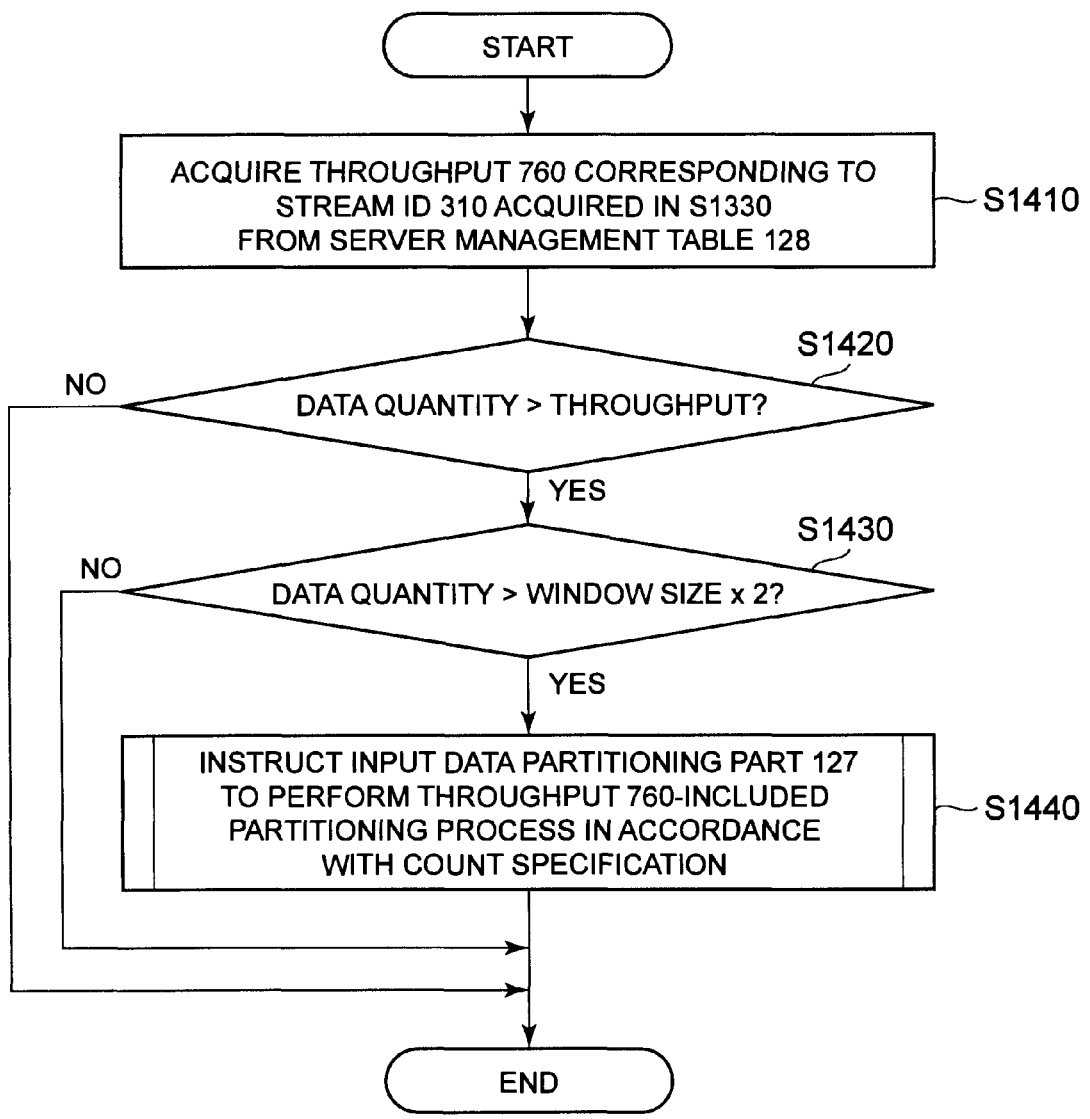
FIG. 14 is a flowchart showing the details of Step 1360 of FIG. 13 (input queue status not taken into account)

FIG. 14 is a flowchart showing the details of Step 1360 of FIG. 13 (input queue status not taken into account).

First, the input data management part 126 acquires from the server management table 128 the throughput 760 corresponding to the stream ID 310 acquired in Step 1330 (Step 1410).

Next, the input data management part 126 determines whether the data quantity 320 acquired in Step 1310 is larger than the throughput 760 (that is, larger than the number of data elements capable of being processed per unit of time) (Step 1420).

In a case where the determination result of Step 1420 is YES, the input data management part 126 determines whether the data quantity 320 is two times larger than the window size 750 acquired in Step 1340 (Step 1430). The reason for making the data quantity 320 two times larger than the window size 750, for example, is as follows. That is, in the case of a count specification, failure to make the partition data quantity at the least equal to or larger than two times the window size will simply increase the amount of computing done by the server (for example, the amount of auxiliary data will increase while result usage data decreases, i.e., most of the processing done by the server will be thrown out), and the overall throughput of the system will decline instead. Therefore, in the determination of Step 1430, the threshold of the data quantity 320 may be set to a value that is X times the window size 750 (where X is an integer equal to or larger than 2). This determination as to whether or not the data quantity is two times larger than the window size 750 may be applied in other steps as well.

In a case where the determination result of Step 1430 is YES, the input data management part 126 instructs the input data partitioning part 127 to perform a partitioning process that includes the throughput 760 (a count specification-based partitioning process) (Step 1440).

In a case where the determination result of either Step 1420 or Step 1430 is NO, load leveling is not carried out.

Figure 15:
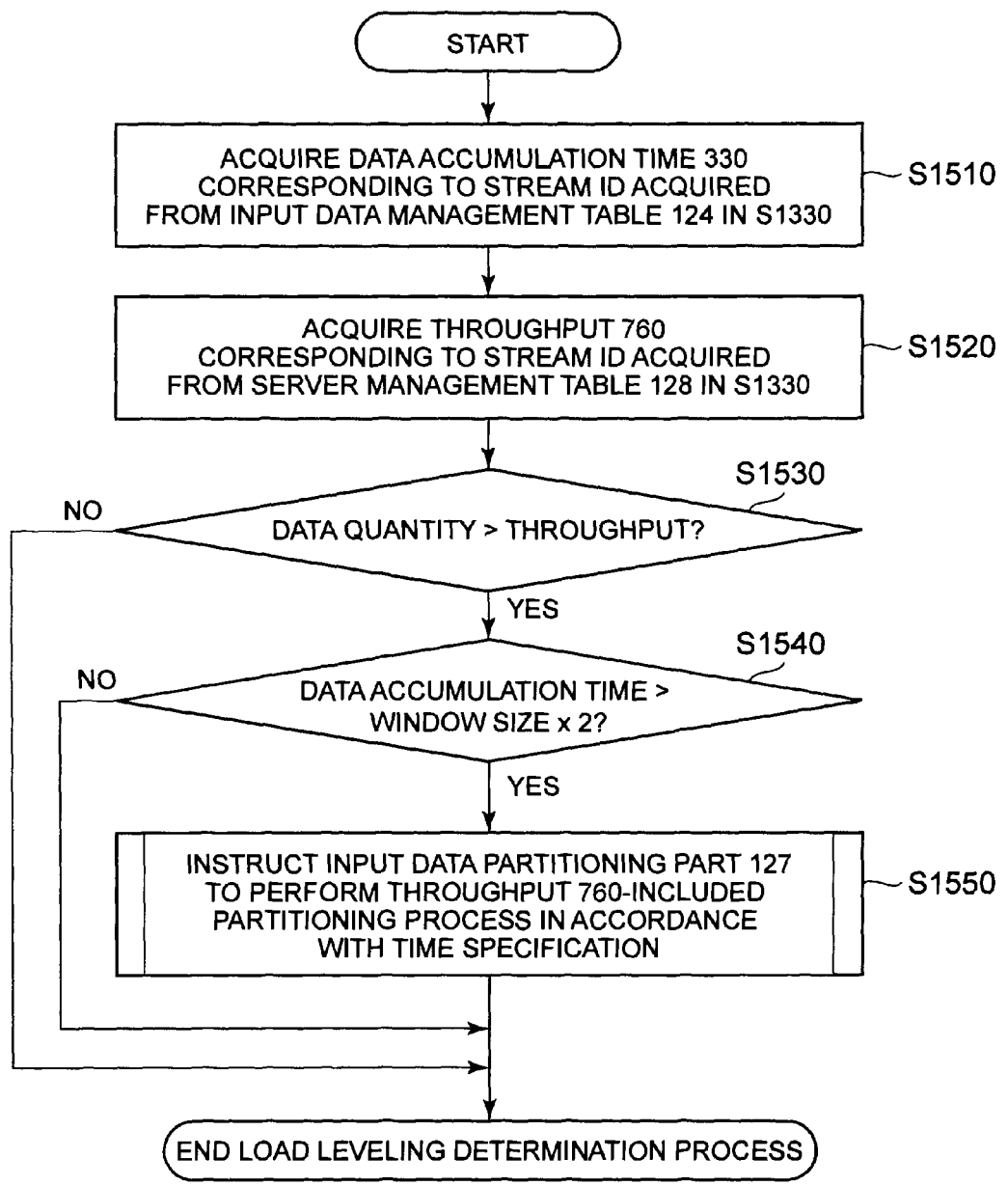
FIG. 15 is a flowchart showing the details of Step 1380 of FIG. 13 (input queue status not taken into account)

FIG. 15 is a flowchart showing the details of Step 1380 of FIG. 13 (input queue status not taken into account).

First, the input data management part 126 acquires from the input data management table 124 the data accumulation time 330 corresponding to the stream ID 310 acquired in Step 1330 (Step 1510).

Next, the input data management part 126 acquires from the server management table 128 the throughput 760 corresponding to the stream ID 310 acquired in Step 1330 (Step 1520).

Next, the input data management part 126 determines whether or not the data quantity 320 acquired in Step 1310 is larger than the throughput 760 (Step 1530).

In a case where the determination result of Step 1530 is YES, the input data management part 126 determines whether or not the data accumulation time 330 is two times larger than the window size 750 acquired in Step 1340 (Step 1540).

In a case where the determination result of Step 1540 is YES, the input data management part 126 instructs the input data partitioning part 127 to perform a partitioning process including the throughput 760 (a time specification-based partitioning process) (Step 1550).

In a case where the determination result of either Step 1530 or Step 1540 is NO, load leveling is not carried out.

Figure 16:
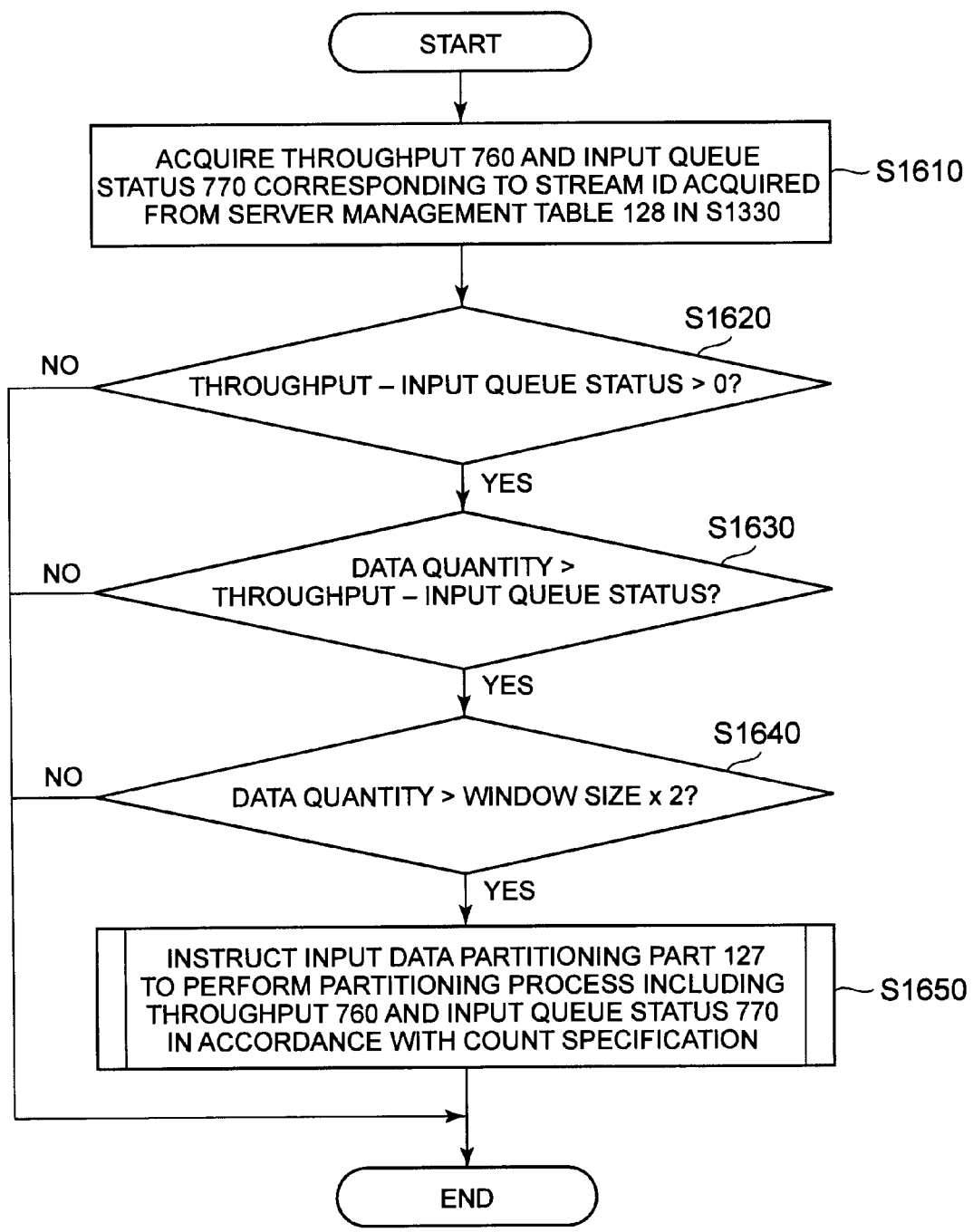
FIG. 16 is a flowchart showing the details of Step 1360 of FIG. 13 (input queue status taken into account)

FIG. 16 is a flowchart showing the details of Step 1360 of FIG. 13 (input queue status taken into account).

First, the input data management part 126 acquires from the server management table 128 the throughput 760 and the input queue status 770 corresponding to the stream ID 310 acquired in Step 1330 (Step 1610).

Next, the input data management part 126 determines whether or not the difference obtained by subtracting the input queue status 770 from the throughput 760 is a positive value (Step 1620).

In a case where the determination result of Step 1620 is YES, the input data management part 126 determines whether or not the data quantity 320 acquired in Step 1310 is larger than the difference obtained in Step 1620 (Step 1630).

In a case where the determination result of Step 1630 is YES, the input data management part 126 determines whether the data quantity 320 is two times larger than the window size 750 acquired in Step 1340 (Step 1640).

In a case where the determination result of Step 1640 is YES, the input data management part 126 instructs the input data partitioning part 127 to perform a partitioning process including the throughput 760 and the input queue status 770 (a count specification-based partitioning process) (Step 1650).

In a case where the determination result of Step 1620, 1630 or 1640 is NO, load leveling is not carried out.

Figure 17:
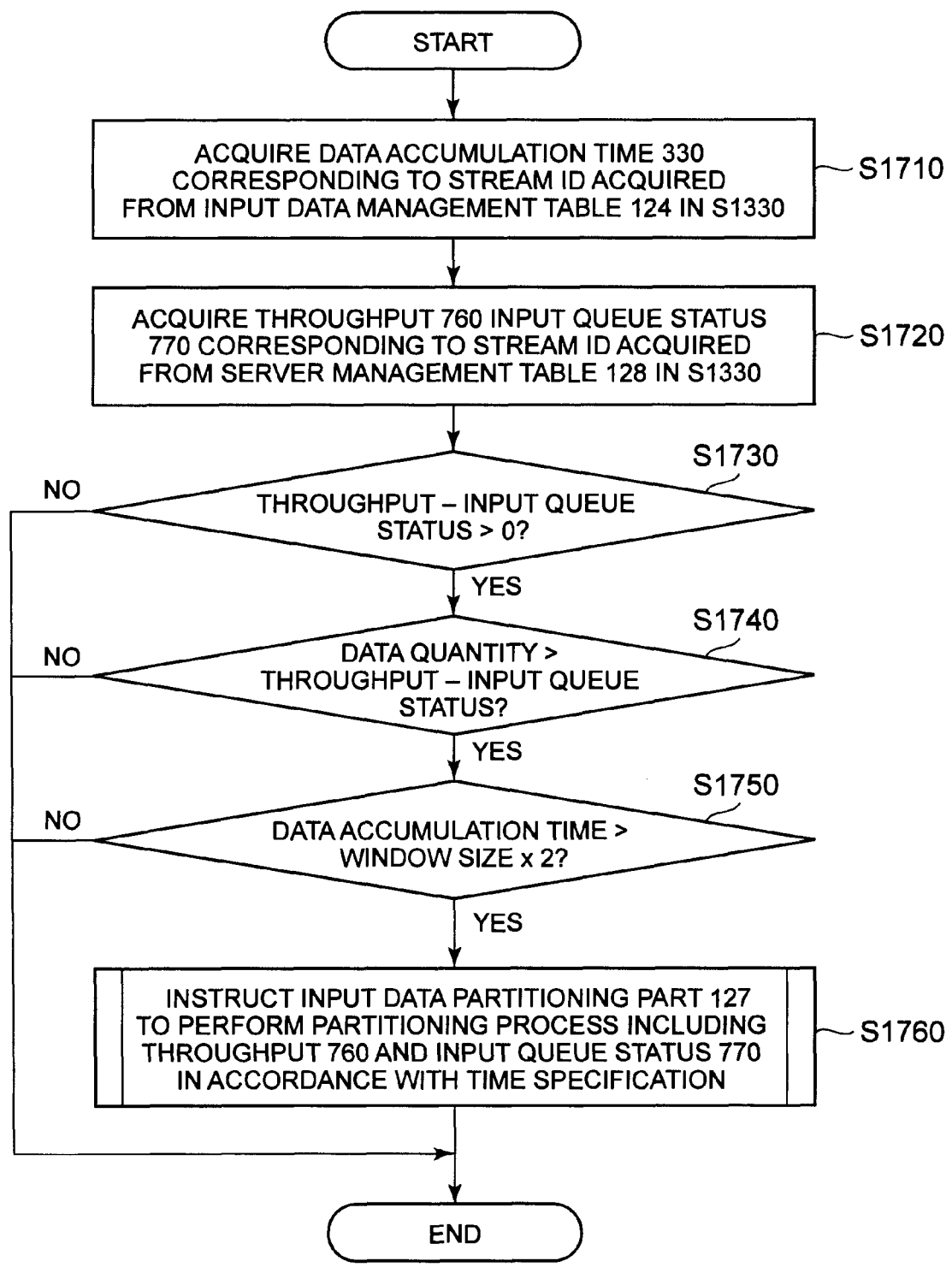
FIG. 17 is a flowchart showing the details of Step 1380 of FIG. 13 (input queue status taken into account)

FIG. 17 is a flowchart showing the details of Step 1380 of FIG. 13 (input queue status taken into account).

First, the input data management part 126 acquires from the input data management table 124 the data accumulation time 330 corresponding to the stream ID 310 acquired in Step 1330 (Step 1710).

Next, the input data management part 126 acquires from the server management table 128 the throughput 760 and the input queue status 770 corresponding to the stream ID 310 acquired in Step 1330 (Step 1720).

Next, the input data management part 126 determines whether or not the difference obtained by subtracting the input queue status 770 from the throughput 760 is a positive value (Step 1730).

In a case where the determination result of Step 1730 is YES, the input data management part 126 determines whether or not the data quantity 320 acquired in Step 1310 is larger than the difference obtained in Step 1730 (Step 1740).

In a case where the determination result of Step 1740 is YES, the input data management part 126 determines whether the data accumulation time 330 is two times larger than the window size 750 acquired in Step 1340 (Step 1750).

In a case where the determination result of Step 1750 is YES, the input data management part 126 instructs the input data partitioning part 127 to perform a partitioning process including the throughput 760 and the input queue status 770 (a time specification-based partitioning process) (Step 1760).

In a case where the determination result of Step 1730, 1740 or 1750 is NO, load leveling is not carried out.

Figure 18:
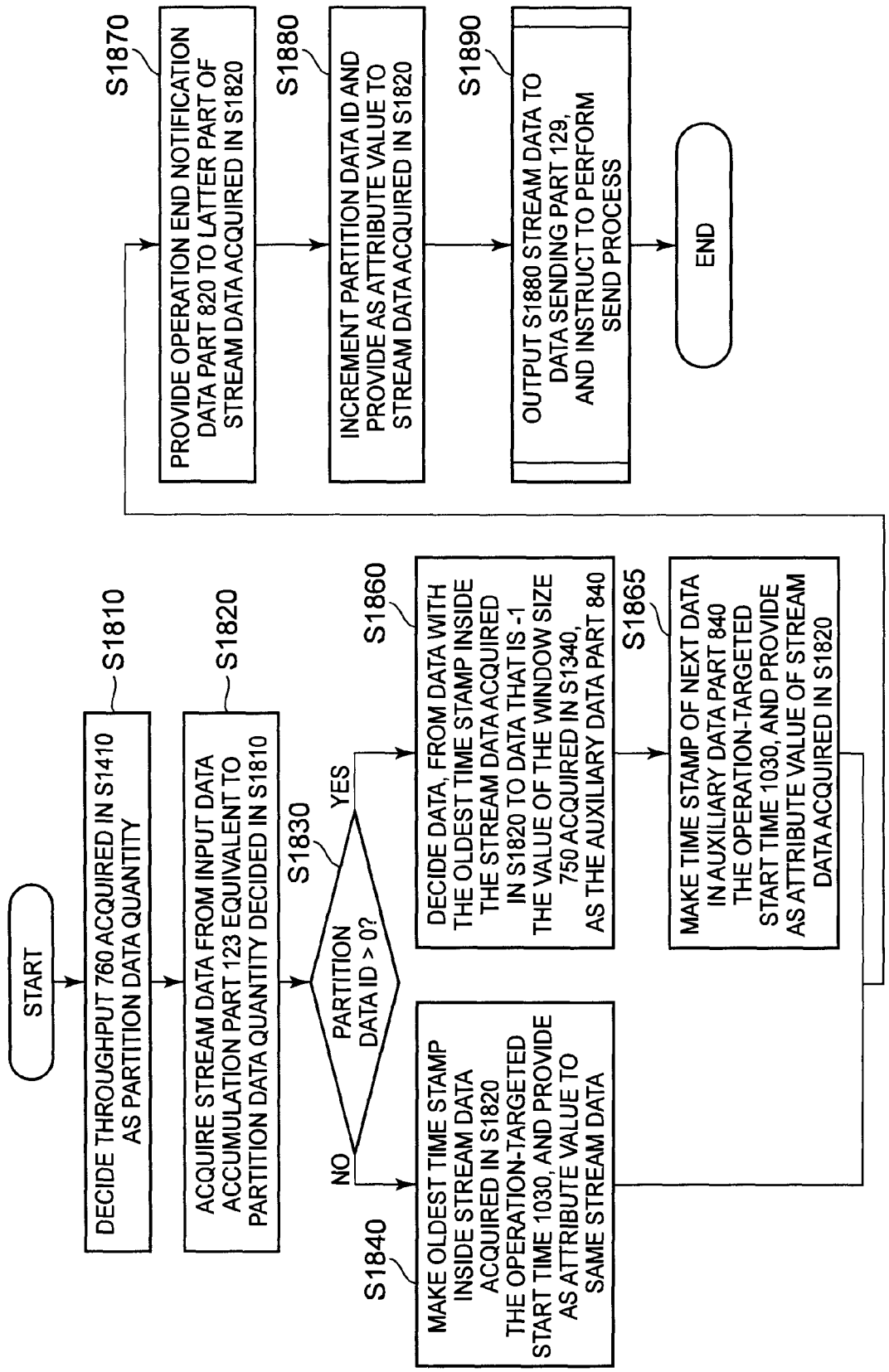
FIG. 18 is a flowchart of a partition process carried out in response to an instruction in Step 1440 of FIG. 14.

FIG. 18 is a flowchart of the partitioning process performed in response to the instruction of Step 1440 of FIG. 14.

First, the input data partitioning part 127 decides on the throughput 760 acquired in Step 1410 as the partition data quantity (Step 1810). That is, the number of data elements to be processed per unit of time denoted by the throughput 760 is decided as the number of data elements that will configure the partition data.

Next, the input data partitioning part 127 acquires the same number of data elements as the partition data quantity decided in Step 1810 (hereinafter will be referred to as the "data element group" in the explanation of FIG. 18) from the stream data accumulated in the input data accumulation part 123 (Step 1820).

Next, the input data partitioning part 127 determines whether or not the partition data ID is larger than 0 (Step 1830).

In a case where the determination result of Step 1830 is YES, the input data partitioning part 127 decides the data elements, among the data element group acquired in S1820, to be included in the auxiliary data part 840 by counting from the data element having the oldest time stamp to the n-th data element ("n" is a value equivalent to that obtained by subtracting 1 from the value of the window size 750 acquired in Step 1340) (Step 1860). Then, the input data partitioning part 127 makes the time stamp of the data element subsequent to the decided auxiliary data part 840 (the first data element of the result usage data part 830) the operation-targeted start time, and provides this operation-targeted start time as the attribute value of the data element group acquired in Step 1820 (Step 1865).

In a case where the determination result of Step 1830 is NO, the input data partitioning part 127 makes the oldest time stamp from among the data element group acquired in Step 1820 the operation-targeted start time, and provides the operation-targeted start time 1030 to the same data element group as the attribute value (Step 1840).

Next, the input data partitioning part 127 provides the operation end notification data part 820 at the rear of the data element group acquired in Step 1820 (Step 1870).

Next, the input data partitioning part 127 increments the partition data ID, and provides the post-incremented partition data ID to the data element group acquired in Step 1820 as the attribute value (Step 1880). The partition data is complete in accordance with this Step 1880.

Next, the input data partitioning part 127 outputs the partition data created in Step 1880 to the data sending part 129, and instructs that this partition data be sent (Step 1890).

Figure 19:
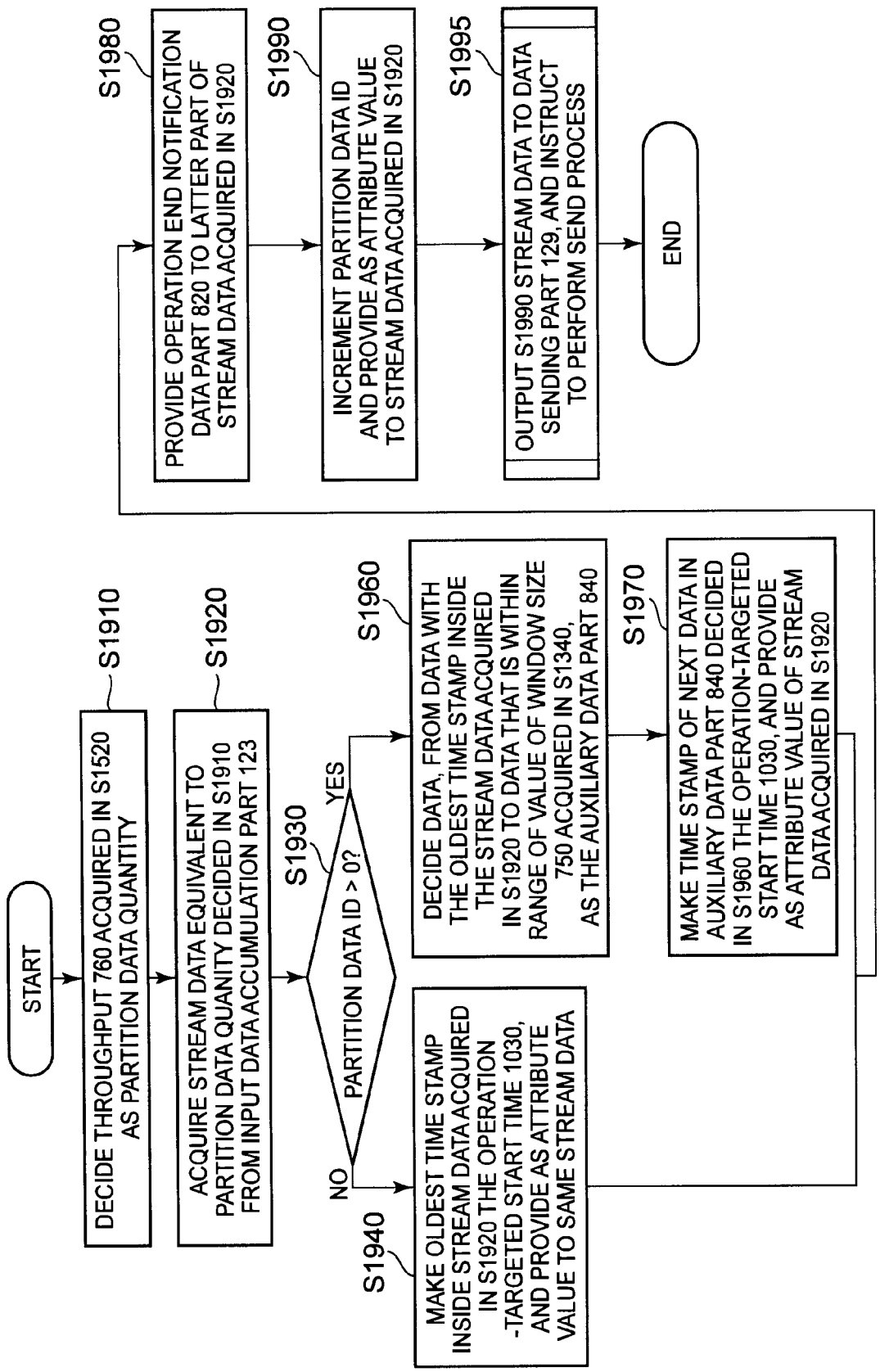
FIG. 19 is a flowchart of a partition process carried out in response to an instruction in Step 1550 of FIG. 15.

FIG. 19 is a flowchart of the partitioning process performed in response to the instruction of Step 1550 of FIG. 15.

The partitioning process shown in this drawing differs from the partitioning process shown in FIG. 18 in that the processing performed when the partition data ID is larger than 0 is different, but the other processes are the same as the partitioning process shown in FIG. 18. That is, Step 1960 differs from Step 1860 of FIG. 18, but the other Steps 1910, 1920, 1930, 1940, 1970, 1980, 1990 and 1995 are respectively the same as the Steps 1810, 1820, 1830, 1840, 1865, 1870, 1880 and 1890 shown in FIG. 18.

In Step 1960, the input data partitioning part 127 decides on the data elements to be included in the auxiliary data part 840 as being from the data element having the oldest time stamp to the data element that falls within the range of the value of the window size 750 acquired in Step 1340 in the data element group acquired in Step 1920. Note that the "data element group" referred to here is one or more data elements that have been outputted from the stream data accumulating in the input data accumulation part 123, and is the same number of data elements as the number of data elements capable of being processed per unit of time denoted by the throughput 760.

Figure 20:
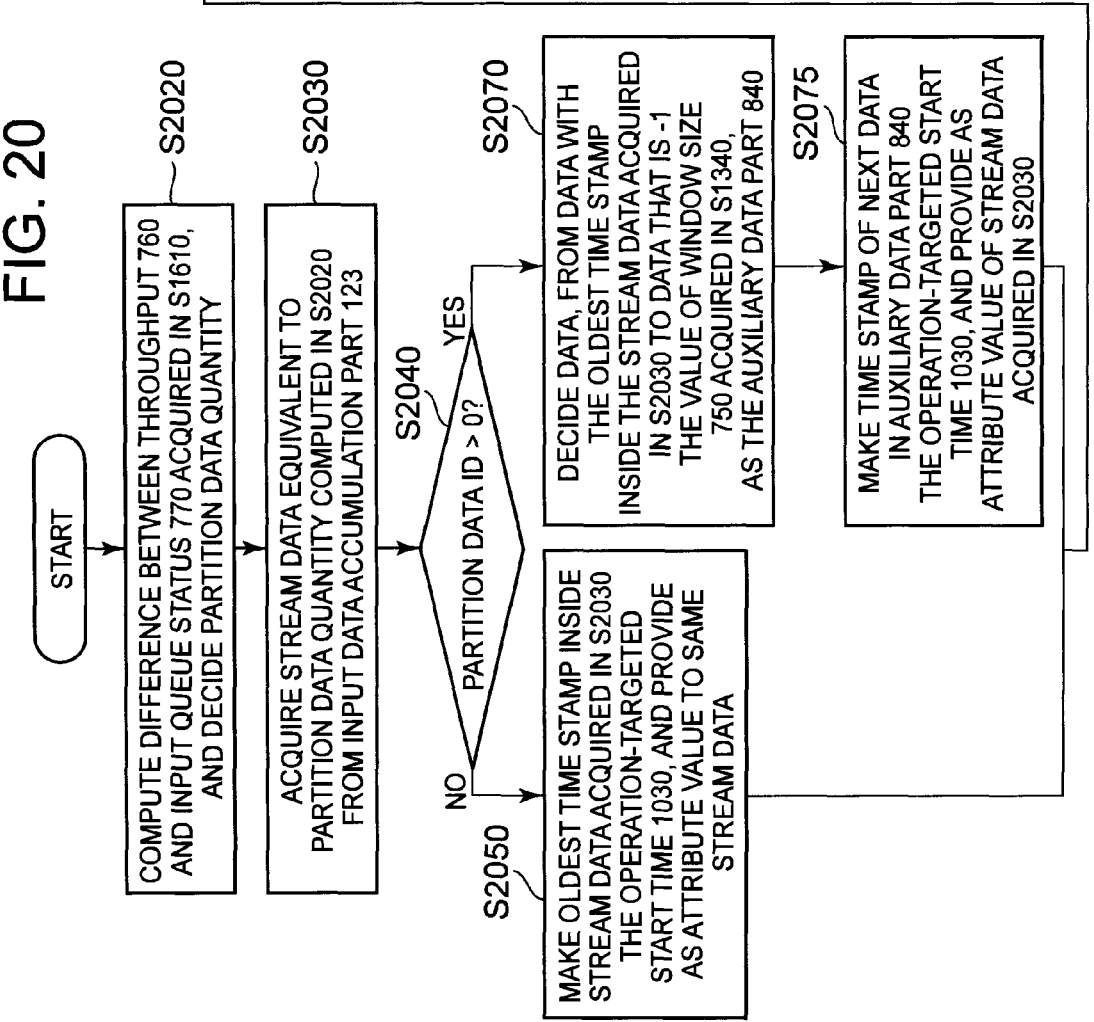
FIG. 20 is a flowchart of a partition process carried out in response to an instruction in Step 1650 of FIG. 16.

FIG. 20 is a flowchart of the partitioning process performed in response to the instruction of Step 1650 of FIG. 16.

The partitioning process shown in this drawing differs from the partitioning process shown in FIG. 18 in that the method for choosing the partition data quantity is different, but the other processes are the same as the partitioning process shown in FIG. 18. That is, Step 2020 differs from Step 1810 of FIG. 18, but the other Steps 2030, 2040, 2050, 2070, 2075, 2080, 2090 and 2100 are respectively the same as the Steps 1820, 1830, 1840, 1860, 1865, 1870, 1880 and 1890 shown in FIG. 18.

In Step 2020, the input data partitioning part 127 computes the difference between the throughput 760 and the input queue status 770 acquired in Step 1610, and decides on this difference as the partition data quantity (Step 2020). That is, the difference (a positive value) between the number of data elements to be processed per unit of time denoted by the throughput 760 and the number of data elements denoted by the input queue status 770 is decided as the number of data elements that will configure the partition data.

Figure 21:
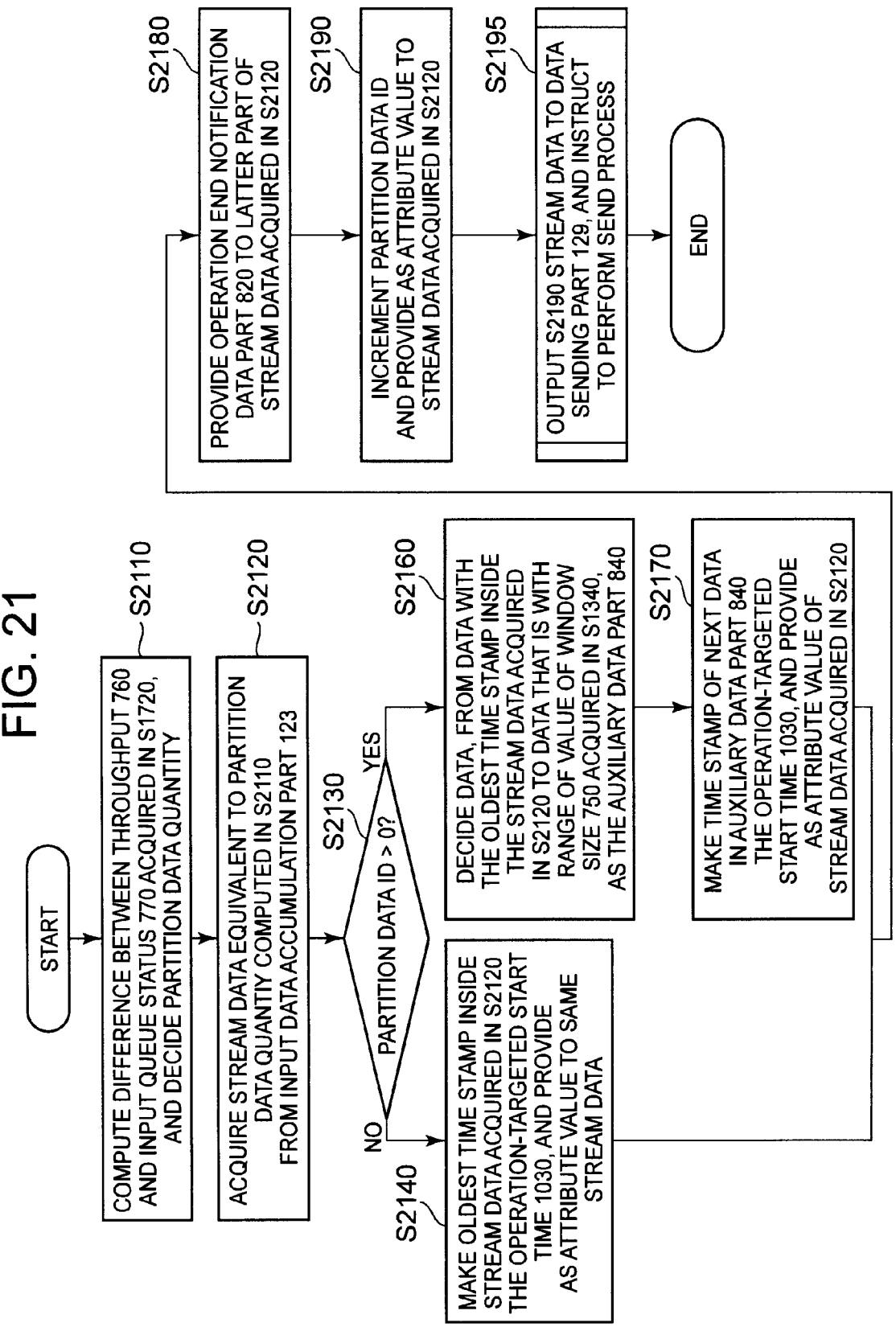
FIG. 21 is a flowchart of a partition process carried out in response to an instruction in Step 1760 of FIG. 17.

FIG. 21 is a flowchart of the partitioning process performed in response to the instruction of Step 1760 of FIG. 17.

The partitioning process shown in this drawing differs from the partitioning process shown in FIG. 19 in that the method for choosing the partition data quantity is different, but the other processes are the same as the partitioning process shown in FIG. 19. That is, Step 2110 differs from Step 1910 of FIG. 19, but the other Steps 2120, 2130, 2140, 2160, 2170, 2180, 2190 and 2195 are respectively the same as the Steps 1920, 1930, 1940, 1960, 1970, 1980, 1990 and 1995 shown in FIG. 19.

In Step 2110, the input data partitioning part 127 computes the difference between the throughput 760 and the input queue status 770 acquired in Step 1720, and decides on this difference as the partition data quantity (Step 2110). That is, the difference (a positive value) between the number of data elements to be processed per unit of time denoted by the throughput 760 and the number of data elements denoted by the input queue status 770 is decided as the number of data elements that will configure the partition data.

Figure 22:
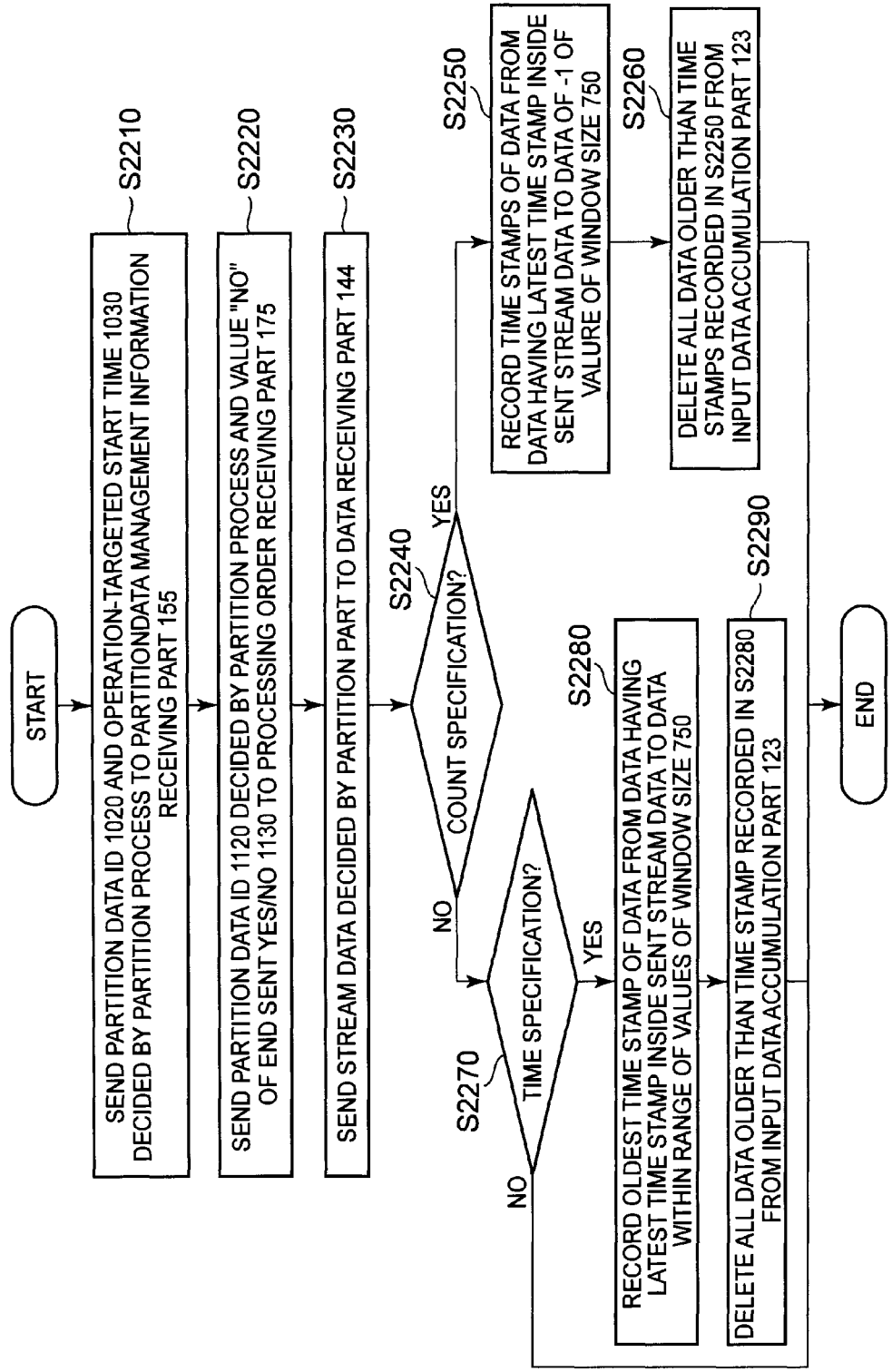
FIG. 22 is a flowchart of a sending process carried out in response to an instruction in the partition process.

FIG. 22 is a flowchart of a sending process carried out in response to an instruction in the partition process (the instruction in Step 1890 of FIG. 18, Step 1995 of FIG. 19, Step 2100 of FIG. 20, or Step 2195 of FIG. 21).

First, the data sending part 129 sends the partition data ID and the operation-targeted start time (the operation-targeted start time provided as the attribute value) decided in the partitioning process to the partition data management information receiving part 155 (Step 2210). The partition data management information receiving part 155 respectively records the partition data ID (the ID provided as the attribute value) and the operation-targeted start time from the data sending part 129 in the partition data management table 150 as the partition data ID 1020 and the operation-targeted start time 1030.

Next, the data sending part 129 sends partition data ID decided in the partitioning process and the value "NO" of the END sent YES/NO to the processing order receiving part 175 (Step 2220). The processing order receiving part 175 respectively records the partition data ID and the "NO" value of the END sent YES/NO from the data sending part 129 to the processing order control table 176 as the partition data ID 1120 and the END sent YES/NO 1130.

Next, the data sending part 129 sends the partition data decided in the partitioning process to the data receiving part 144 (Step 2230).

Next, the data sending part 129 determines whether or not the window size 750 acquired in Step 1340 is a count specification (Step 2240).

In a case where the determination result of Step 2240 is YES, the data sending part 129 counts from the data element having the newest time stamp of the sent partition data, and records the time stamp of the data element with a value equivalent to that obtained by subtracting 1 from the value of the window size 750 in the storage area (for example, a register) (Step 2250). Then, the data sending part 129 deletes all data elements that are older than the time stamp recorded in Step 2250 from the input data accumulation part 123 (Step 2260).

In a case where the determination result of Step 2240 is NO, the data sending part 129 determines whether or not the window size 750 acquired in Step 1340 is a time specification (Step 2270).

In a case where the determination result of Step 2270 is YES, the data sending part 129 records the time stamps from the data element having the newest time stamp to the data element having the oldest time stamp from among the sent partition data within the range of values of the window size 750 in the storage area (for example, the register) (Step 2280). Then, the data sending part 129 deletes all the data elements that are older than the time stamps recorded in Step 2280 from the input data accumulation part 123 (Step 2290).

Figure 23:
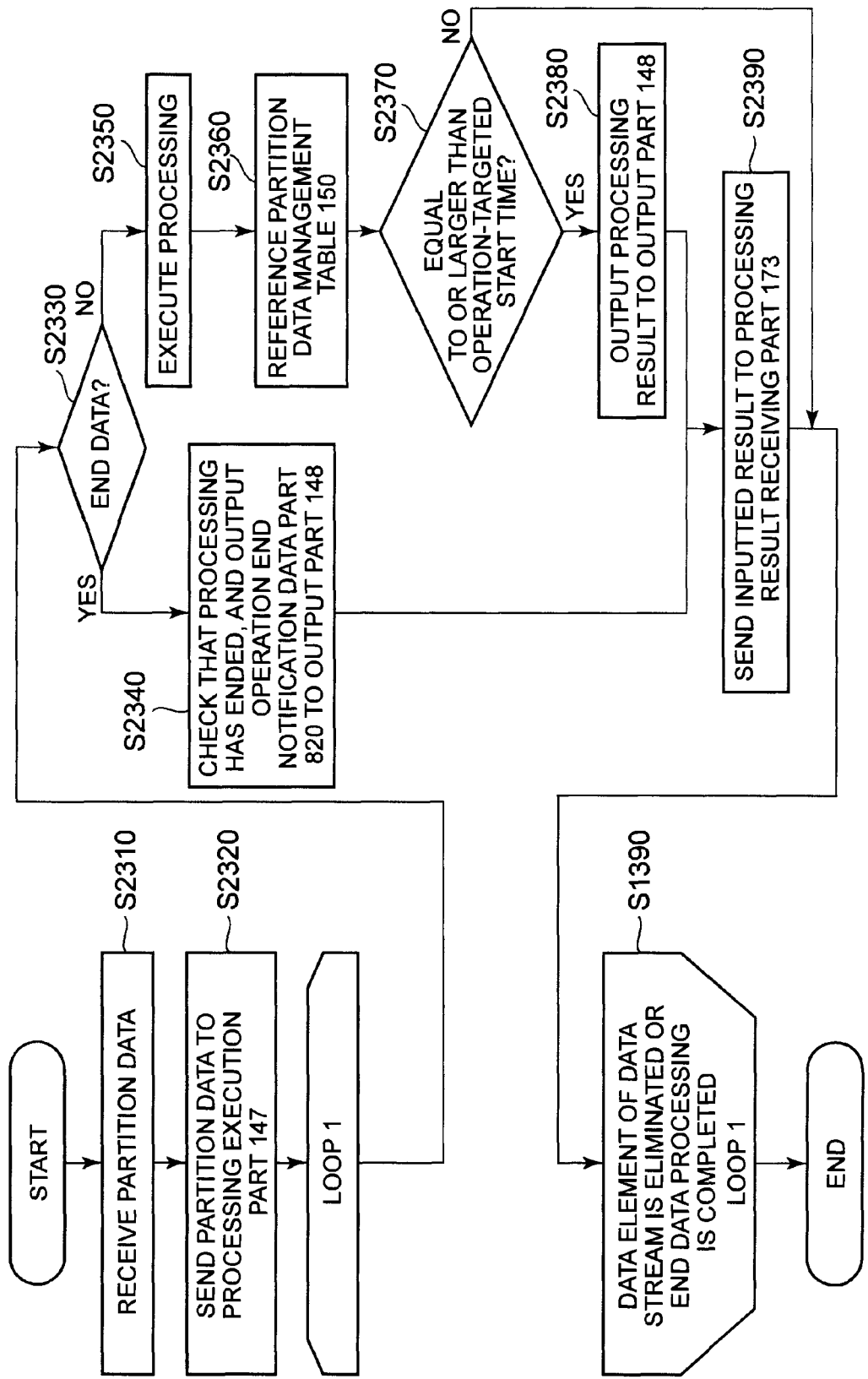
FIG. 23 is a flowchart of the processing of partition data in accordance with the query processing part 145.

FIG. 23 is a flowchart of the processing of partition data by the query processing part 145.

First, the input part 146 receives the partition data (Step 2310).

Next, the input part 146 sends the partition data to the processing execution part 147 (Step 2320).

Next, the processing execution part 147 determines whether or not the received partition data is the operation end notification data part 820 (Step 2330).

In a case where the determination result of Step 2330 is YES, the processing execution part 147 confirms that processing has ended, and outputs the operation end notification data part 820 to the output part 148 (Step 2340).

In a case where the determination result of Step 2330 is NO, the processing execution part 147 executes processing (Step 2350), and references the partition data management table 150 (Step 2360). The processing execution part 147 determines whether or not the processed stream data is equal to or larger than the value of the operation-targeted start time 1030 as a result of the reference (Step 2370).

In a case where the determination result of Step 2370 is YES, the processing execution part 147 outputs the processing result to the output part 148 (Step 2380).

Next, the output part 148 sends the inputted result to the processing result receiving part 173 (Step 2390).

Figure 24:
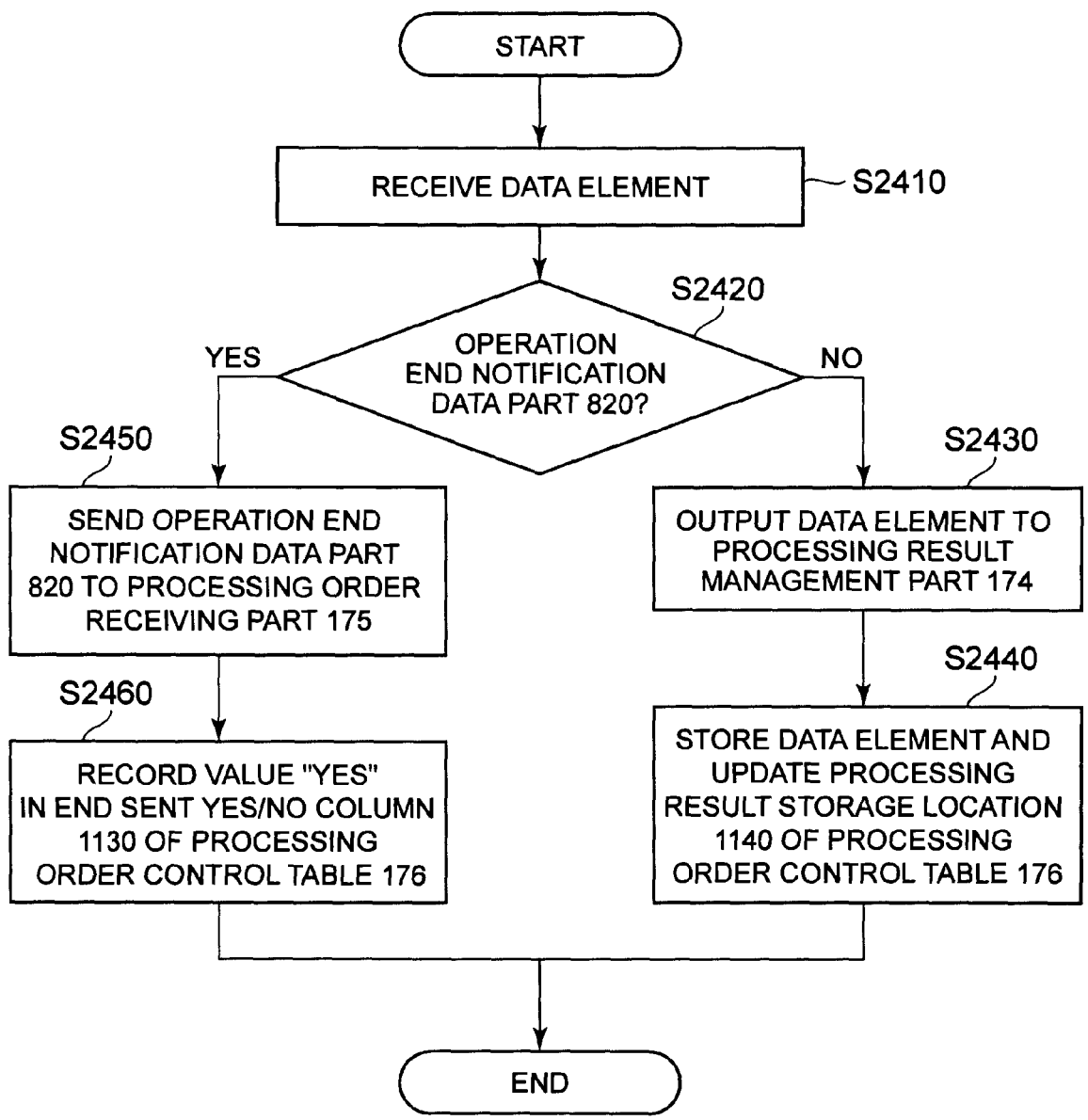
FIG. 24 is a flowchart of processing by a processing result control program 172 of a processing result sent by an output part 148.

FIG. 24 is a flowchart of processing by the processing result control program 172 of the processing result sent from the output part 148.

First, the processing result receiving part 173 receives the processing result from the output part 148 (Step 2410).

Next, the processing result receiving part 173 determines whether or not the processing result is the operation end notification data part 820 (Step 2420).

In a case where the determination result of Step 2420 is YES, the processing result receiving part 173 sends the operation end notification data part 820 to the processing order receiving part 175 (Step 2450). The processing order receiving part 175 records "YES" in the processing order control table 176 as the END sent YES/NO 1130 (Step 2460).

In a case where the determination result of Step 2420 is NO, the processing result receiving part 173 outputs the processing result to the processing result management part 174 (Step 2430). The processing result management part 174 stores the processing result in either the primary storage apparatus 171 or the secondary storage apparatus 179, and updates the processing result storage location 1140 of the processing order control table 176 (Step 2440).

The preceding has been an explanation of the first embodiment.

According to the first embodiment, the partition data quantity is the same as the server throughput, but this is because the END data is not counted among the number of data elements. In a case where the END data is counted among the number of data elements, the partition data quantity will become a value that is 1 less than the value of the server throughput. It is desirable that the unit of time for the server throughput and the unit of time that is defined in the window size by the time specification be identical (for example, it is desirable that this unit of time be expressed in "seconds"). In a case where these units differ, it is desirable that they be converted to the same unit.

In the first embodiment, as is clear from FIG. 13, while the stream data is being continuously inputted to the input data accumulation part 123, the loop 1 shown in FIG. 13 (that is, the determination as to whether or not load leveling will be done, the creation of the partition data, the sending of the partition data, and the processing of the partition data) is repeated.

In the repetition of loop 1, the server computer that will become the destination of the partition data is switched in accordance with a predetermined rule (for example, round robin). Specifically, for example, in a case where the partition data has been sent to the first server computer 140 N times (N being a natural number), the second server computer 160 is selected as the partition data destination. When the partition data has been sent to this second server computer 160 N times, the first server computer 140 is selected once again as the partition data destination. The window size considered in FIGS. 13 through 22 is the window size defined by the query of the server computer that is the partition data destination. The throughput considered in FIGS. 13 through 22 is the throughput of the server computer that is the partition data destination.

The throughput of the first server computer 140 and the second server computer 160 does not always have to be the same for the same stream ID and query ID. For example, for the stream ID "1" and the query ID "1", the throughput of the first server computer 140 may be 1000 counts/second, while the throughput of the second server computer 140 may be 300 counts/seconds.

A situation in which the processing result obtained via processing in a single server computer is the same even though the load leveling related to the first embodiment has been performed will be explained below. In so doing, a case in which processing is done by a single server computer will be called "Case A", and the case in which processing is done by the two server computers 140 and 160 (the first embodiment) will be called "Case B". In Case B, it is supposed that the window size is "3" in accordance with the count specification and the throughput is "5" for both server computers 140 and 160. In both Case A and Case B, it is supposed that each data element configuring the stream data comprises a single natural number, and that the natural numbers in this stream data are consecutive. Hereinbelow, a data element having the natural number "P" as a value will be expressed as <P>.

<<Case A>>

(A1) The partition data sent the first time comprises <1>, <2>, <3>, <4>, and <5>. The processing results outputted from the server computer are 1, 3(1+2), 6 (1+2+3), 9 (6+4−1), 12 (9+5−2).

(A2) The partition data sent the second time is <6>, <7>, <8>, <9>, and <10>. The processing results outputted from the server computer are 15 (12+6−3), 18(15+7−4), 21 (18+8−5), 24 (21+9−6), 27 (24+10−7).

(A3) The partition data sent the third time comprises <11>, <12>, <13>, <14>, and <15>. The processing results outputted from the server computer are 30, 33, 36, 39, 42.

Therefore, in Case A, 1, 3, 6, 9, 12, 15, 18, 21, 24, 27, 30, . . . are outputted to the output control computer as the processing results.

<<Case B>>

(B1) The partition data sent the first time comprises <1>, <2>, <3>, <4>, and <5>. Because this is the first partition data, there is no auxiliary data part. This partition data is sent to the first server computer 140. The processing results outputted from the first server computer 140 are 1, 3(1+2), 6 (1+2+3), 9 (6+4−1), 12 (9+5−2).

(B2) The partition data sent the second time is <4>, <5>, <6>, <7>, and <8>. Since a number that is 1 less than the window size "3" is the number of data elements that configure the auxiliary data part (the auxiliary data quantity), the first two data elements <4> and <5> are the data elements that configure the auxiliary data part and the remaining data elements <6>, <7> and <8> are the data elements that belong to the result usage data part. This partition data is sent to the second server computer 160. The processing results outputted from the second server computer 160 are 15 (9+6), 18(15+7−4), 21 (18+8−5). That is, although <4> and <5>, which make up the auxiliary data part, are targeted for processing and are utilized in the processing of the result usage data, they are not outputted as processing results.

(B3) The partition data sent the third time comprises <7>, <8>, <9>, <10>, and <11>. The first two data elements <7> and <8> are the data elements that configure the auxiliary data part. This partition data is sent to the first server computer 140. The processing results outputted from the first server computer 140 are 24 (21+9−6), 27 (24+10−7), 30 (27+11−8).

Therefore, in Case B as well, 1, 3, 6, 9, 12, 15, 18, 21, 24, 27, 30, . . . , are outputted to the output control computer as the processing results. This is exactly the same as Case A.

According to the first embodiment above, the input control computer 120 creates a plurality of stream data-based partition data, and sends this plurality of partition data to the server computers 140 and 160. The data quantity of the partition data is decided on the basis of the throughput (or the throughput and input queue status) of either server 140 or 160, whichever is the destination of this partition data. The partition data is configured from the above-described auxiliary data part, result usage data part and operation end notification data part, and the size of the auxiliary data part (the number of data elements included in the auxiliary data part) is decided based on the window size defined in the query of either destination server computer 140 or 160. For this reason, the system developer may define a query for each server computer without taking into account the amount of stream data and the system configuration.

According to the first embodiment, the input control computer 120 determines whether or not to perform load leveling based on the amount of stream data. For this reason, load leveling may be performed in response to an increase in the amount of stream data. Therefore, the present invention is not only applicable to batch processing in which the amount of stream data is fixed, but is also applicable to online processing for processing continuously generated stream data. For example, in a case where the amount of stream data has decreased until it corresponds with a predetermined condition, the input control computer 120 may also carry out degeneration processing that halts the creation of partition data based on the stream data and sends the stream data to a single server computer.

Second Embodiment

A second embodiment of the present invention will be explained below. In so doing, the differences with the first embodiment will mainly be explained, and explanations of the points in common with the first embodiment will either be simplified or omitted.

In the first embodiment, the amount of auxiliary data (the number of data elements included in the auxiliary data part) is decided automatically based on the window size defined in the query, but in the second embodiment, the amount of auxiliary data is set manually.

Figure 25:
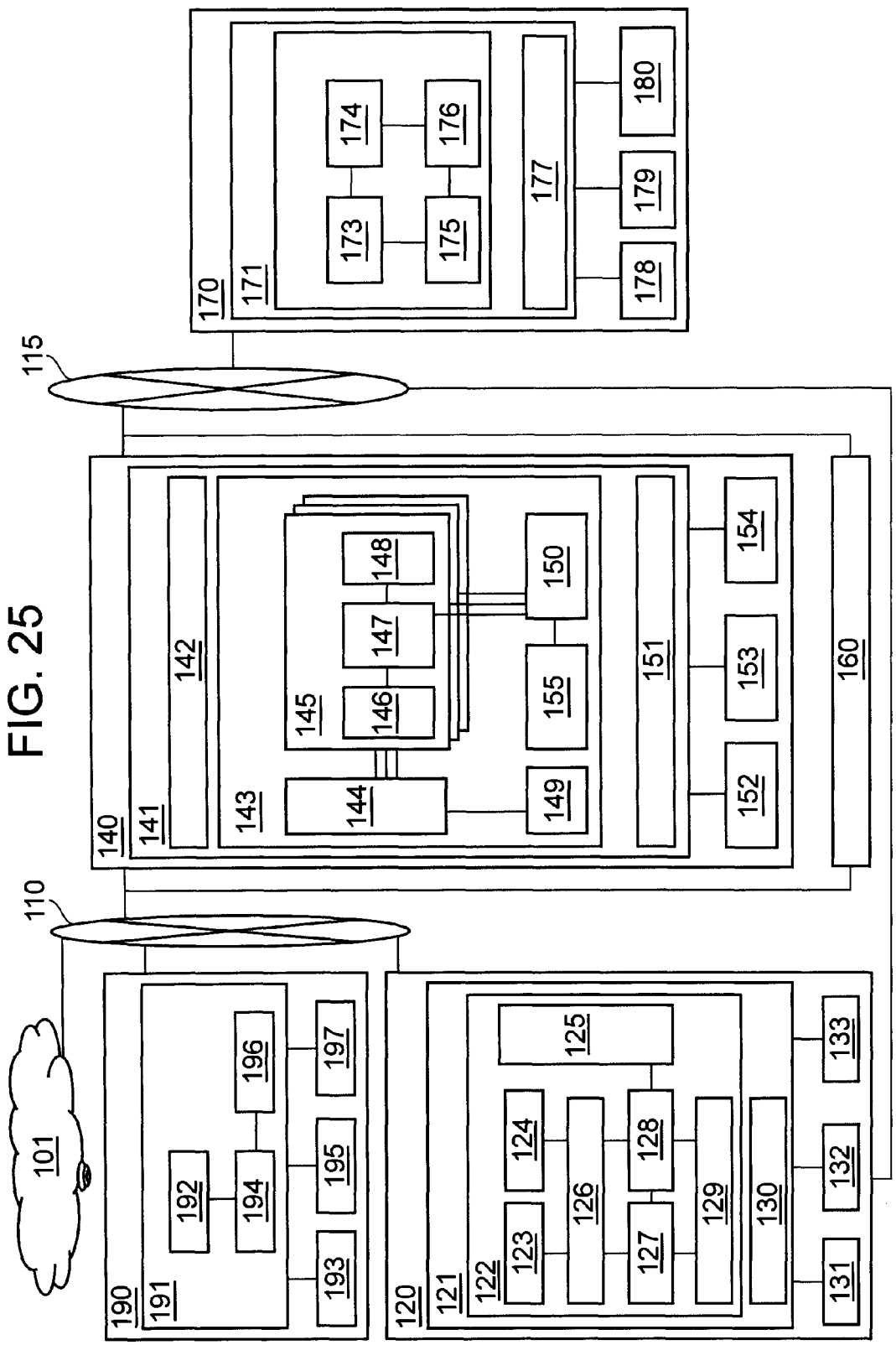
FIG. 25 is a block diagram showing the overall configuration of a stream data processing system related to a second embodiment of the present invention.

FIG. 25 is a block diagram of the overall configuration of a stream data processing system related to the second embodiment of the present invention.

A user specification computer 190 is coupled to the network 110. The user specification computer 190 comprises a CPU 193, a secondary storage apparatus 195, a communication interface 197, and a primary storage apparatus 191. A data partitioning specification program 194 and a data partitioning specification management table 196 are stored in the primary storage apparatus 191.

The data partitioning specification program 194 displays a screen (hereinafter, the user partitioning specification screen) for inputting the auxiliary data quantity. The user partitioning specification screen may be displayed on the display device (not shown in the drawing) of the computer 190 and may be displayed on a remote display device by way of the network 110.

Figures 26, 27:
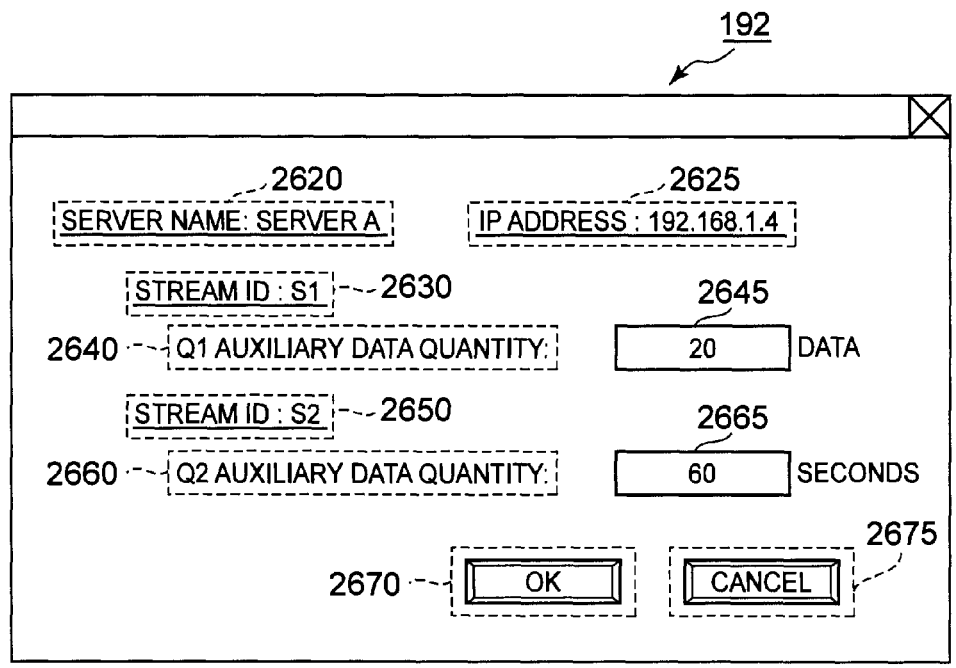
FIG. 26 shows an example of a data partitioning specification screen 192.
FIG. 27 shows an example of a data partitioning specification management table 196.

FIG. 26 shows an example of the data partitioning specification screen 192.

The data partitioning specification screen 192 comprises a server name display field 2620 in which the server name of the first server computer 140 is displayed, a server IP address display field 2625 in which the IP address of the first server computer 140 is displayed, a stream ID display field 2630 in which the stream ID "S1" registered in the first server computer 140 is displayed, a stream ID display field 2650 in which the stream ID "S2" registered in the same first server computer 140 is displayed, a text field 2645 for inputting the auxiliary data quantity 2640 of the query ID "Q1" corresponding to the stream ID "S1", a text field 2665 for inputting the auxiliary data quantity 2660 of the query ID "Q2" corresponding to the stream ID "S2", an OK button 2670, and a CANCEL button 2675.

This screen 192, for example, is displayed when the user specifies the Server A. The IP address, the stream ID, and the query ID of the Server A, for example, are acquired from the server management table 128 by querying the input data control program 122.

When a value is inputted to the text field 2645, the data partitioning specification program 194 references the server management table 128, specifies the window size 750 corresponding to the stream ID "S1" and the query ID "Q1" displayed on this screen 192, and determines whether or not the inputted valued is larger than the specified window size 750.

In a case where the value inputted to the text field 2645 is determined to be the same or smaller than the window size 750, the data partitioning specification program 194 displays a screen showing an input error. This screen implies that the value that has been inputted to the text field 2645 should be a different value.

Alternatively, in a case where the value inputted to the text field 2645 is determined to be larger than the window size 750, the data partitioning specification program 194 displays the inputted value in the text field 2645.

The same determination as the determination made for the text field 2645 is also made for the text field 2665.

When the OK button 2670 is pressed, the data partitioning specification program 194 respectively records the values being displayed in the text field 2645 as well as the text field 2665 in the data partitioning specification management table 196 as the auxiliary data quantity 2650 (refer to FIG. 27).

FIG. 27 shows an example of the data partitioning specification management table 196.

The data partitioning specification management table 196 comprises a value that denotes the quantity of the auxiliary data part 820 of the partition data 810. Specifically, this table 196 comprises a server name 2610, an IP address 2620, a stream ID 2630, a query ID 2640, and an auxiliary data quantity 2650. The server name 2610, the IP address 2620, the stream ID 2630, and the query ID 2640 are the server name, the IP address, the stream ID, and the query ID displayed on the screen 192 of FIG. 26, and the auxiliary data quantity 2650 is the value inputted into the text field 2665 by the user.

FIG. 28 is a flowchart showing the steps for updating the server management table 128 in the second embodiment.

First, the server information acquisition part 125 communicates with the server monitoring program 142 via the network 110, and instructs the server monitoring program 142 to acquire the server information (Step 2810).

Next, the server monitoring program 142, in response to the instruction from the server information acquisition part 125, references the query management table 149 and acquires the stream ID from the stream ID recording column 1010, and acquires the query ID from the query ID recording column 920 (Step 2820).

Next, the server monitoring program 142 queries the query processing part 145, and acquires the throughput corresponding to the acquired query ID (Step 2830).

Next, the server monitoring program 142 queries the input part 146 that exists in the query processing part 145 corresponding to the acquired query ID, and acquires the input queue status from the input part 146 (Step 2840).

Next, the server monitoring program 142 sends the stream ID, the query ID, the throughput, and the input queue status acquired from Step 2820 through Step 2840 to the server information acquisition part 125 (Step 2850).

Next, the server information acquisition part 125 references the data partitioning specification table 196, and acquires the auxiliary data quantity corresponding to the query ID (Step 2860). Next, the server information acquisition part 125 determines whether or not the auxiliary data quantity is a count specification (Step 2870).

In a case where the determination result of Step 2870 is YES, the server information acquisition part 125 adds 1 to the value of the auxiliary data quantity (Step 2880). The reason for this is as set forth in (1) and (2) below.
(1) The value "auxiliary data quantity+1" of this Step 2880 is recorded in the server management table 128 as the window size 750 in the below-described Step 2890.
(2) In the case of a window size that conforms to a count specification, the number of data elements included in the auxiliary data part in the partitioning process is "window size−1".

Lastly, the server information acquisition part 125 updates the relevant row of the server management table 128 (the row in which is recorded the server computer name that exists in the server monitoring program 142, which is the destination of the instruction in Step 2810) (Step 2890). That is, the server information acquisition part 125 records the stream ID and the query ID acquired in Step 2820 as the stream ID 730 and the query ID 740, records the throughput acquired in Step 2830 as the throughput 760, records the input queue status acquired in Step 2840 as the input queue status 770, and records the auxiliary data quantity of either Step 2860 or Step 2880 as the window size 750.

A number of embodiments of the present invention have been explained above, but the present invention is not limited to these embodiments.

For example, in the above-described first and second embodiments, the input data control program 122 and the processing result control program 172 are installed in separate computers, but these programs 122 and 172 may be installed in a single computer. In addition, the specific configuration of each apparatus/device, each program, and each flowchart may be arbitrarily changed (unified or separated) within a scope that does not depart from the gist of the present invention. For example, at the least one of the input control computer, the plurality of server computers, and the output control computer may be configured as a plurality of computers.

What is claimed is:

1. A stream data processing apparatus that is coupled to a plurality of computers for processing a data element in stream data, which is configured from a plurality of time-sequence data elements, the stream data processing apparatus comprising:
a communication interface configured to receive the stream data from a stream data source; and
a controller, which is coupled to the communication interface, and which accumulates the received stream data in a storage resource, configured to create a plurality of partition data based on the stream data inside the storage resource and distribute the plurality of partition data to a plurality of computers by sending one or more partition data among the plurality of partition data to a computer selected as a destination computer from among the plurality of computers,
wherein the data element comprises a time stamp and a value of the data element, wherein the time stamp denotes time at which the data element comprising this time stamp has been created,
wherein the partition data is configured from a data element group, which is two or more consecutive data elements of the stream data, and END data that comprises end as the time stamp and null as the value, is data that denotes an end of the partition data, and is different from the data element, and wherein the data element group comprises an auxiliary data part, which is a first part of the data element group, and a result usage data part, which is a part subsequent to the first part,
wherein the controller is configured to:
(A) acquire, from the stream data, the data element group, which is formed by a number of data elements, wherein the number is determined based on a processing capability of the destination computer,
(B) decide a number of the data elements of the auxiliary data part of the data element group acquired in based on a window size, which is a data range size, denoted by a query in which a processing content and the window size are defined with respect to the destination computer,
(C) create the partition data that includes the data element group and the END data,
(D) send result usage specification information, which is information for specifying a leading data element in the result usage data part that follows the auxiliary data part decided in (B) and comprises a time stamp of the oldest data element from among the one or more data elements that belong to the result usage data part, to the destination computer, and
(E) send the partition data to the destination computer, and
wherein the destination computer is configured to receive the partition data and to process the received partition data based on time stamps in the received partition data.

2. The stream data processing apparatus according to claim 1,
wherein the window size expresses the number of data elements, and
wherein the number of data elements of the auxiliary data part decided in (B) is the number obtained by subtracting 1 from the window size.

3. The stream data processing apparatus according to claim 2,
wherein the controller carries out (X) below:
(X) determination is made regarding whether or not load leveling is to be performed based on the processing capability, which is a number of data elements that the destination computer is able to process per unit of time, the window size that is defined by the query, and a number of accumulated data elements, which is a number of data elements forming the stream data accumulated in the storage resource, and
wherein the controller, in a case where a determination result of (X) is affirmative, carries out (A) through (E), and in a case where the determination result of (X) is not affirmative, does not carry out (A) through (E),
wherein the determination result of (X) becomes affirmative in a case where (x1) and (x2) below are satisfied:
(x1) the number of accumulated data elements is larger than the processing capability; and
(x2) the number of accumulated data elements is larger than two times the window size.

4. The stream data processing apparatus according to claim 2,
wherein the controller carries out (X) below:
(X) determination is made regarding whether or not load leveling is to be performed based on the processing capability, which is a number of data elements that the destination computer is able to process per unit of time, the window size that is defined by the query, a number of accumulated data elements, which is a number of data elements forming the stream data accumulated in the storage resource, and a backlog number, which is a number of data elements that are accumulated without being processed in the destination computer,
wherein the controller, in a case where a determination result of (X) is affirmative, carries out (A) through (E), and in a case where the determination result of (X) is not affirmative, does not carry out (A) through (E),
wherein the determination result of (X) becomes affirmative in a case where (x1) through (x3) below are satisfied:
(x1) a value obtained by subtracting the backlog number from the destination computer processing capability is a positive value,
(x2) the number of accumulated data elements is larger than the value obtained by subtracting the backlog number from the processing capability, and
(x3) the number of accumulated data elements is larger than a predetermined magnitude for the window size.

5. The stream data processing apparatus according to claim 1,
wherein the window size expresses a time as a range of data element time stamps, and
wherein the number of data elements of the auxiliary data part decided in (B) is the same as a value denoted by the window size.

6. The stream data processing apparatus according to claim 5,
wherein the controller carries out (X) below:
(X) determination is made regarding whether or not load leveling is to be performed based on the processing capability, which is a number of data elements that the destination computer is able to process per unit of time, the window size that is defined by the query, a number of accumulated data elements, which is a number of data elements forming the stream data accumulated in the storage resource, and an accumulation length of time, which is a difference between the time stamp of the oldest data element and the time stamp of the newest data element among the stream data accumulated in the storage resource,
wherein the controller, in a case where a determination result of (X) is affirmative, carries out (A) through (E), and in a case where the determination result of (X) is not affirmative, does not carry out (A) through (E),
wherein the determination result of (X) becomes affirmative in a case where (x1) and (x2) below are satisfied:
(x1) the number of accumulated data elements is larger than the processing capability, and
(x2) the accumulation length of time is greater than two times the window size.

7. The stream data processing apparatus according to claim 5,
wherein the controller carries out (X) below:
(X) determination is made regarding whether or not load leveling is to be performed based on the processing capability, which is a number of data elements that the destination computer is able to process per unit of time, the window size that is defined by the query, a number of accumulated data elements, which is a number of data elements forming the stream data accumulated in the storage resource, a accumulation length of time, which is a difference between the time stamp of the oldest data element and the time stamp of the newest data element among the stream data accumulated in the storage resource, and the backlog number, which is a number of data elements that are accumulated without being processed in the destination computer,
wherein the controller, in a case where a determination result of (X) is affirmative, carries out (A) through (E), and in a case where the determination result of (X) is not affirmative, does not carry out (A) through (E),
wherein the determination result of (X) becomes affirmative in a case where (x1) through (x3) below are satisfied:
(x1) the value obtained by subtracting the backlog number from the destination computer processing capability is a positive value,
(x2) the number of accumulated data elements is larger than the value obtained by subtracting the backlog number from the processing capability, and
(x3) the accumulation length of time is greater than two times of the window size.

8. The stream data processing apparatus according to claim 1,
wherein the number of data elements forming the data element group acquired in (A) is either the same number as the processing capability, which is a number of data elements that the destination computer is able to process per unit of time, or a number that is 1 less than the same number as the processing capability.

9. The stream data processing apparatus according to claim 1,
wherein the number of data elements forming the data element group acquired in (A) is either the same number as a value obtained by subtracting a backlog number, which is a number of data elements accumulated without being processed in the destination computer, from the processing capability, which is a number of data elements that the destination computer is able to process per unit of time, or a number that is 1 less than the same number as the value obtained by subtracting the backlog number from the processing capability.

10. The stream data processing apparatus according to claim 1,
wherein after (E), the controller deletes, from among the data element group in the partition data, data elements other than a K consecutive data elements from data elements at an end of this data element group, and wherein a value of K is the same value as the number of data elements forming the auxiliary data part.

11. A method for processing stream data, which is formed by a plurality of time-sequence data elements, the stream data processing method comprising following steps of:
(A) receiving stream data from a stream data source;
(B) accumulating the received stream data in a storage resource; and
(C) creating a plurality of partition data based on the stream data inside the storage resource and distributing the plurality of partition data to a plurality of computers by sending one or more partition data to a computer selected as a destination computer from among the plurality of computers,
wherein a data element includes a time stamp and a value of the data element, and the time stamp expresses time at which the data element including this time stamp has been created,
wherein the partition data is configured from a data element group, which is two or more consecutive data elements of the stream data, and END data that comprises end as the time stamp and null as the value, is data that denotes an end of the partition data, and is different from the data element, and the data element group comprises an auxiliary data part, which is a first part of the data element group, and a result usage data part, which is a part subsequent to the first part,
wherein the method further comprising, in (C), following steps of:
(c1) acquiring, from the stream data, the data element group, formed by a number of data elements, wherein the number is determined based on a processing capability of the destination computer;
(c2) deciding a number of the data elements of the auxiliary data part of the data element group acquired in the (c1) based on a window size, which is a data range size, denoted by a query in which a processing content and the window size are defined with respect to the destination computer;
(c3) creating the partition data that includes the data element group and the END data;
(c4) sending result usage specification information, which is information for specifying a leading data element in the result usage data part that follows the auxiliary data part decided in the (c2) and comprises a time stamp of the oldest data element from among the one or more data elements that belong to the result usage data part, to the destination computer; and
(c5) sending the partition data to the destination computer, and
wherein the destination computer receives the partition data and processes the received partition data based on time stamps in the received partition data.

12. A non-transitory computer readable medium having machine instructions stored therein, the instructions being executable by one or more processors to cause the one or more processors to process stream data formed by a plurality of time-sequence data elements comprising:
(A) receiving stream data from a stream data source;
(B) accumulating the received stream data in a storage resource; and
(C) creating a plurality of partition data based on the stream data inside the storage resource and distributing the plurality of partition data to a plurality of computers by sending one or more partition data to a computer selected as a destination computer from among the plurality of computers,
wherein a data element includes a time stamp and a value of the data element, and the time stamp expresses time at which the data element including this time stamp has been created,
wherein the partition data is configured from a data element group, which is two or more consecutive data elements of the stream data, and END data that comprises end as the time stamp and null as the value, is data that denotes an end of the partition data, and is different from the data element, and the data element group comprises an auxiliary data part, which is a first part of the data element group, and a result usage data part, which is a part subsequent to the first part,
wherein the program causing the computer to further execute, in (C), the steps of:
(c1) acquiring, from the stream data, the data element group, formed by a number of data elements, wherein the number is determined based on a processing capability of the destination computer;
(c2) deciding a number of the data elements of the auxiliary data part of the data element group acquired in the (c1) based on a window size denoted by a query in which a processing content and the window size, which is a data range size, are defined with respect to the destination computer;
(c3) creating the partition data that includes the data element group and the END data;
(c4) sending result usage specification information, which is information for specifying a leading data element in the result usage data part that follows the auxiliary data part decided in the (c2) and comprises a time stamp of the oldest data element from among the one or more data elements that belong to the result usage data part, to the destination computer; and
(c5) sending the partition data to the destination computer, and
wherein the destination computer receives the partition data and processes the received partition data based on time stamps in the received partition data.

* * * * *